US012579174B1

(12) United States Patent
Jedema et al.

(10) Patent No.: US 12,579,174 B1
(45) Date of Patent: Mar. 17, 2026

(54) EVALUATING RETRIEVAL SYSTEM FOR LANGUAGE MODEL PROCESSING

(71) Applicant: Amazon Technologies, Inc., Seattle, WA (US)

(72) Inventors: Nicolaas Jedema, Santa Barbara, CA (US); Leonardo Filipe Rodrigues Ribeiro, Kirkland, WA (US); Alessandro Moschitti, Playa de Rey, CA (US); Matteo Gabburo, Bassano del Grappa, CA (US); Siddhant Garg, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/621,221

(22) Filed: Mar. 29, 2024

(51) Int. Cl.
| | |
|---|---|
| *G06F 16/33* | (2025.01) |
| *G06F 16/3329* | (2025.01) |
| *G06F 16/338* | (2019.01) |
| *G06F 40/40* | (2020.01) |

(52) U.S. Cl.
CPC ........ *G06F 16/3329* (2019.01); *G06F 16/338* (2019.01); *G06F 40/40* (2020.01)

(58) Field of Classification Search
CPC ..... G06F 16/3329; G06F 16/338; G06F 40/40
See application file for complete search history.

(56) References Cited

U.S. PATENT DOCUMENTS

| | | |
|---|---|---|
| 10,331,402 B1 | 6/2019 | Spector et al. |
| 10,642,577 B2 | 5/2020 | Spector et al. |
| 10,699,215 B2 * | 6/2020 | Devarakonda ......... G06N 5/022 |
| 11,080,336 B2 * | 8/2021 | Van Dusen ............ G06Q 50/01 |
| 11,314,819 B2 * | 4/2022 | Katzman ................ G06F 16/31 |
| 11,449,556 B2 * | 9/2022 | Jawagal ................ G06F 40/284 |
| 11,740,863 B2 | 8/2023 | Spector et al. |
| 12,008,473 B2 * | 6/2024 | Lazaridou ............. G06F 16/953 |
| 12,405,985 B1 * | 9/2025 | Kanagovi ............. G06F 16/335 |
| 2017/0293638 A1 * | 10/2017 | He ......................... G06N 3/044 |
| 2018/0081906 A1 * | 3/2018 | Katz ................... G06F 16/3329 |
| 2018/0082187 A1 * | 3/2018 | Katz ..................... G06N 5/041 |
| 2018/0165580 A1 * | 6/2018 | Boyer .................... G06F 16/00 |
| 2021/0390418 A1 * | 12/2021 | Mass ................... G06N 3/0499 |

(Continued)

OTHER PUBLICATIONS

Asai, Akari, et al. "Self-RAG: Learning to retrieve, generate, and critique through self-reflection." arXiv preprint arXiv:2310.11511 (2023).

(Continued)

*Primary Examiner* — Eliyah S. Harper
(74) *Attorney, Agent, or Firm* — Pierce Atwood LLP

(57) ABSTRACT

Techniques for determining whether retrieved content is sufficient for a language model to generate a response to an input are described. In some embodiments, a system may determine a retrieval complexity (RC) metric based on a question, a reference answer and document results retrieved from a retrieval component (e.g., a search engine, a knowledge search, etc.). The RC metric may be based on whether one of the document results corresponds to the reference answer and whether the reference answer can be determined from the set of the document results (e.g., using two or more document results). The RC metric can be used to determine when retrieved content is to be used by a language model for responding to an input corresponding to the question.

18 Claims, 11 Drawing Sheets

(56) References Cited

U.S. PATENT DOCUMENTS

| | | | | |
|---|---|---|---|---|
| 2022/0138432 A1* | 5/2022 | Galitsky | G06F 40/284 | |
| | | | 704/9 | |
| 2022/0222440 A1* | 7/2022 | Chowdhury | G06F 16/3344 | |
| 2022/0230061 A1* | 7/2022 | Singh | G06V 10/761 | |
| 2022/0335046 A1* | 10/2022 | Oshio | G06F 16/93 | |
| 2022/0335231 A1* | 10/2022 | Oshio | G06F 40/58 | |
| 2022/0343903 A1* | 10/2022 | Mostafazadeh | G06F 3/0481 | |
| 2024/0069860 A1 | 2/2024 | Spector et al. | | |
| 2024/0070434 A1* | 2/2024 | Garg | G06N 3/0455 | |
| 2024/0176980 A1* | 5/2024 | Lee | G06N 3/045 | |
| 2024/0281487 A1* | 8/2024 | Bathwal | G06F 16/24575 | |
| 2024/0362286 A1* | 10/2024 | He | G06F 16/93 | |
| 2024/0370479 A1* | 11/2024 | Hudetz | G06F 16/316 | |
| 2025/0086392 A1* | 3/2025 | Han | G06F 40/40 | |
| 2025/0291827 A1* | 9/2025 | Chong | G06F 16/3329 | |
| 2025/0299059 A1* | 9/2025 | Ahmed | G06N 3/045 | |
| 2025/0307658 A1* | 10/2025 | Wang | G16B 40/20 | |

OTHER PUBLICATIONS

Baumgärtner, Tim, et al. "Incorporating Relevance Feedback for Information-Seeking Retrieval using Few-Shot Document Re-Ranking." arXiv preprint arXiv:2210.10695 (2022).

Baumgärtner, Tim, et al. "UKP-SQUARE: An Online Platform for Question Answering Research." arXiv preprint arXiv:2203.13693 (2022).

Borgeaud, Sebastian, et al. "Improving language models by retrieving from trillions of tokens." International conference on machine learning. PMLR, 2022.

Bulian, Jannis, et al. "Tomayto, tomahto. beyond token-level answer equivalence for question answering evaluation." arXiv preprint arXiv:2202.07654 (2022).

Chen, Wenhu, Xinyi Wang, and William Yang Wang. "A dataset for answering time-sensitive questions." arXiv preprint arXiv:2108.06314 (2021).

Clark, Kevin, et al. "Electra: Pre-training text encoders as discriminators rather than generators." arXiv preprint arXiv:2003.10555 (2020).

Crestani, Fabio, et al. ""Is this document relevant?. . . probably" a survey of probabilistic models in information retrieval." ACM Computing Surveys (CSUR) 30.4 (1998): 528-552.

Dao, Xuan-Quy. "Performance comparison of large language models on vnhsge english dataset: Openai chatgpt, microsoft bing chat, and google bard." arXiv preprint arXiv:2307.02288 (2023).

Deutsch, Daniel, and Dan Roth. "Benchmarking Answer Verification Methods for Question Answering-Based Summarization Evaluation Metrics." arXiv preprint arXiv:2204.10206 (2022).

Jacob Devlin, Ming-Wei Chang, Kenton Lee, and Kristina Toutanova. "BERT: Pre-training of deep bidirectional transformers for language understanding." Proceedings of NAACL-HLT. vol. 1. 2019.

Dua, Dheeru, et al. "DROP: A reading comprehension benchmark requiring discrete reasoning over paragraphs." arXiv preprint arXiv:1903.00161 (2019).

Fan, Yixing, et al. "Modeling diverse relevance patterns in ad-hoc retrieval." The 41st international ACM SIGIR conference on research & development in information retrieval. 2018.

Gabburo, Matteo, et al. "SQUARE: Automatic question answering evaluation using multiple positive and negative references." arXiv preprint arXiv:2309.12250 (2023).

Gabburo, Matteo, et al. "Knowledge transfer from answer ranking to answer generation." arXiv preprint arXiv:2210.12865 (2022).

Geva, Mor, et al. "Did aristotle use a laptop? a question answering benchmark with implicit reasoning strategies." Transactions of the Association for Computational Linguistics 9 (2021): 346-361.

Hsu, Chao-Chun, et al. "Answer generation for retrieval-based question answering systems." arXiv preprint arXiv:2106.00955 (2021).

Huang, Hao, et al. "Understand before answer: Improve temporal reading comprehension via precise question understanding." Pro-ceedings of the 2022 Conference of the North American Chapter of the Association for Computational Linguistics: Human Language Technologies. 2022.

Huang, Lei, et al. "A survey on hallucination in large language models: Principles, taxonomy, challenges, and open questions." arXiv preprint arXiv:2311.05232 (2023).

Jiang, Albert Q., et al. "Mistral 7B." arXiv preprint arXiv:2310.06825 (2023).

Karpukhin, Vladimir, et al. "Dense passage retrieval for open-domain question answering." arXiv preprint arXiv:2004.04906 (2020).

Khattab, Omar, and Matei Zaharia. "Colbert: Efficient and effective passage search via contextualized late interaction over bert." Proceedings of the 43rd International ACM SIGIR conference on research and development in Information Retrieval. 2020.

Kwiatkowski, Tom, et al. "Natural questions: a benchmark for question answering research." Transactions of the Association for Computational Linguistics 7 (2019): 453-466.

Lewis, Mike, et al. "Bart: Denoising sequence-to-sequence pre-training for natural language generation, translation, and comprehension." arXiv preprint arXiv:1910.13461 (2019).

Lewis, Patrick, et al. "Retrieval-augmented generation for knowledge-intensive nlp tasks." Advances in Neural Information Processing Systems 33 (2020): 9459-9474.

Lin, Jimmy, and Xueguang Ma. "A few brief notes on deepimpact, coil, and a conceptual framework for information retrieval techniques." arXiv preprint arXiv:2106.14807 (2021).

Liu, Yinhan, et al. "RoBERTa: A Robustly Optimized BERT Pretraining Approach." arXiv preprint arXiv:1907.11692 (2019).

Luo, Haoran, et al. "Chatkbqa: A generate-then-retrieve framework for knowledge base question answering with fine-tuned large language models." arXiv preprint arXiv:2310.08975 (2023).

Mallia, Antonio, et al. "Learning passage impacts for inverted indexes." Proceedings of the 44th International ACM SIGIR Conference on Research and Development in Information Retrieval. 2021.

Mavi, Vaibhav, Anubhav Jangra, and Adam Jatowt. "A survey on multi-hop question answering and generation." arXiv preprint arXiv:2204.09140 (2022).

Min, Sewon, et al. "Compositional questions do not necessitate multi-hop reasoning." arXiv preprint arXiv:1906.02900 (2019).

Nguyen, Tri, et al. "Ms marco: A human-generated machine reading comprehension dataset." (2016).

Papineni, Kishore, et al. "Bleu: a method for automatic evaluation of machine translation." Proceedings of the 40th annual meeting of the Association for Computational Linguistics. 2002.

Perez, Ethan, et al. "Unsupervised question decomposition for question answering." arXiv preprint arXiv:2002.09758 (2020).

Petroni, Fabio, et al. "KILT: a benchmark for knowledge intensive language tasks." arXiv preprint arXiv:2009.02252 (2020).

Radford, Alec, et al. "Improving language understanding by generative pre-training." (2018).

Colin, Raffel. "Exploring the limits of transfer learning with a unified text-to-text transformer." JMLR 21.140 (2020): 1.

Rajpurkar, Pranav, et al. "Squad: 100,000+ questions for machine comprehension of text." arXiv preprint arXiv:1606.05250 (2016).

Rogers, Anna, Matt Gardner, and Isabelle Augenstein. "Qa dataset explosion: A taxonomy of nlp resources for question answering and reading comprehension." ACM Computing Surveys 55.10 (2023): 1-45.

Saxena, Apoorv, Soumen Chakrabarti, and Partha Talukdar. "Question answering over temporal knowledge graphs." arXiv preprint arXiv:2106.01515 (2021).

Shang, Chao, et al. "Improving time sensitivity for question answering over temporal knowledge graphs." arXiv preprint arXiv:2203.00255 (2022).

Sharma, Aditya, et al. "TwiRGCN: Temporally weighted graph convolution for question answering over temporal knowledge graphs." arXiv preprint arXiv:2210.06281 (2022).

Su, Ming-Hsiang, et al. "RoBERTa-based traditional chinese medicine named entity recognition model." Proceedings of the 34th Conference on Computational Linguistics and Speech Processing (ROCLING 2022). 2022.

(56) References Cited

OTHER PUBLICATIONS

Sun, Tianxiang, et al. "BERTScore is unfair: On social bias in language model-based metrics for text generation." arXiv preprint arXiv:2210.07626 (2022).

Talmor, Alon, and Jonathan Berant. "The web as a knowledge-base for answering complex questions." arXiv preprint arXiv:1803.06643 (2018).

Trivedi, Harsh, et al. " ♩ MuSiQue: Multihop Questions via Single-hop Question Composition." Transactions of the Association for Computational Linguistics 10 (2022): 539-554.

Vaswani, Ashish, et al. "Attention is all you need." Advances in neural information processing systems 30 (2017).

Vu, Thuy, and Alessandro Moschitti. "AVA: an automatic evaluation approach to question answering systems." arXiv preprint arXiv:2005.00705 (2020).

Vu, Tu, et al. "Freshllms: Refreshing large language models with search engine augmentation." arXiv preprint arXiv:2310.03214 (2023).

Wang, Zizhen, et al. "Match$^2$: A matching over matching model for similar question identification." Proceedings of the 43rd international ACM SIGIR conference on research and development in information retrieval. 2020.

Wei, Jason, et al. "Chain-of-thought prompting elicits reasoning in large language models." Advances in neural information processing systems 35 (2022): 24824-24837.

Yan, Yiming, et al. "BLEURT has universal translations: An analysis of automatic metrics by minimum risk training." arXiv preprint arXiv:2307.03131 (2023).

Yang, Zhilin, et al. "HotpotQA: A dataset for diverse, explainable multi-hop question answering." arXiv preprint arXiv:1809.09600 (2018).

Yoran, Ori, et al. "Answering questions by meta-reasoning over multiple chains of thought." arXiv preprint arXiv:2304.13007 (2023).

Khashabi, Daniel, et al. "GooAQ: Open question answering with diverse answer types." arXiv preprint arXiv:2104.08727 (2021).

Khot, Tushar, et al. "Qasc: A dataset for question answering via sentence composition." Proceedings of the AAAI Conference on Artificial Intelligence. vol. 34. No. 05. 2020.

Abujabal, Abdalghani, et al. "Comqa: A community-sourced dataset for complex factoid question answering with paraphrase clusters." arXiv preprint arXiv:1809.09528 (2018).

BehnamGhader, Parishad, Santiago Miret, and Siva Reddy. "Can retriever-augmented language models reason? the blame game between the retriever and the language model." arXiv preprint arXiv:2212.09146 (2022).

Patel, Pruthvi, et al. "Is a question decomposition unit all we need?." arXiv preprint arXiv:2205.12538 (2022).

Dua, Dheeru, et al. "Successive prompting for decomposing complex questions." arXiv preprint arXiv:2212.04092 (2022).

Min, Sewon, et al. "Multi-hop reading comprehension through question decomposition and rescoring." arXiv preprint arXiv:1906.02916 (2019).

Radhakrishnan, Ansh, et al. "Question decomposition improves the faithfulness of model-generated reasoning." arXiv preprint arXiv:2307.11768 (2023).

Daull, Xavier, et al. "Complex QA and language models hybrid architectures, Survey." arXiv preprint arXiv:2302.09051 (2023).

Borji, Ali. "A categorical archive of chatgpt failures." arXiv preprint arXiv:2302.03494 (2023).

Kazemnejad, Amirhossein, et al. "Measuring the knowledge acquisition-utilization gap in pretrained language models." arXiv preprint arXiv:2305.14775 (2023).

Lauriola, Ivano, Kevin Small, and Alessandro Moschitti. "Building a Dataset for Automatically Learning to Detect Questions Requiring Clarification." Proceedings of the Thirteenth Language Resources and Evaluation Conference. 2022.

* cited by examiner

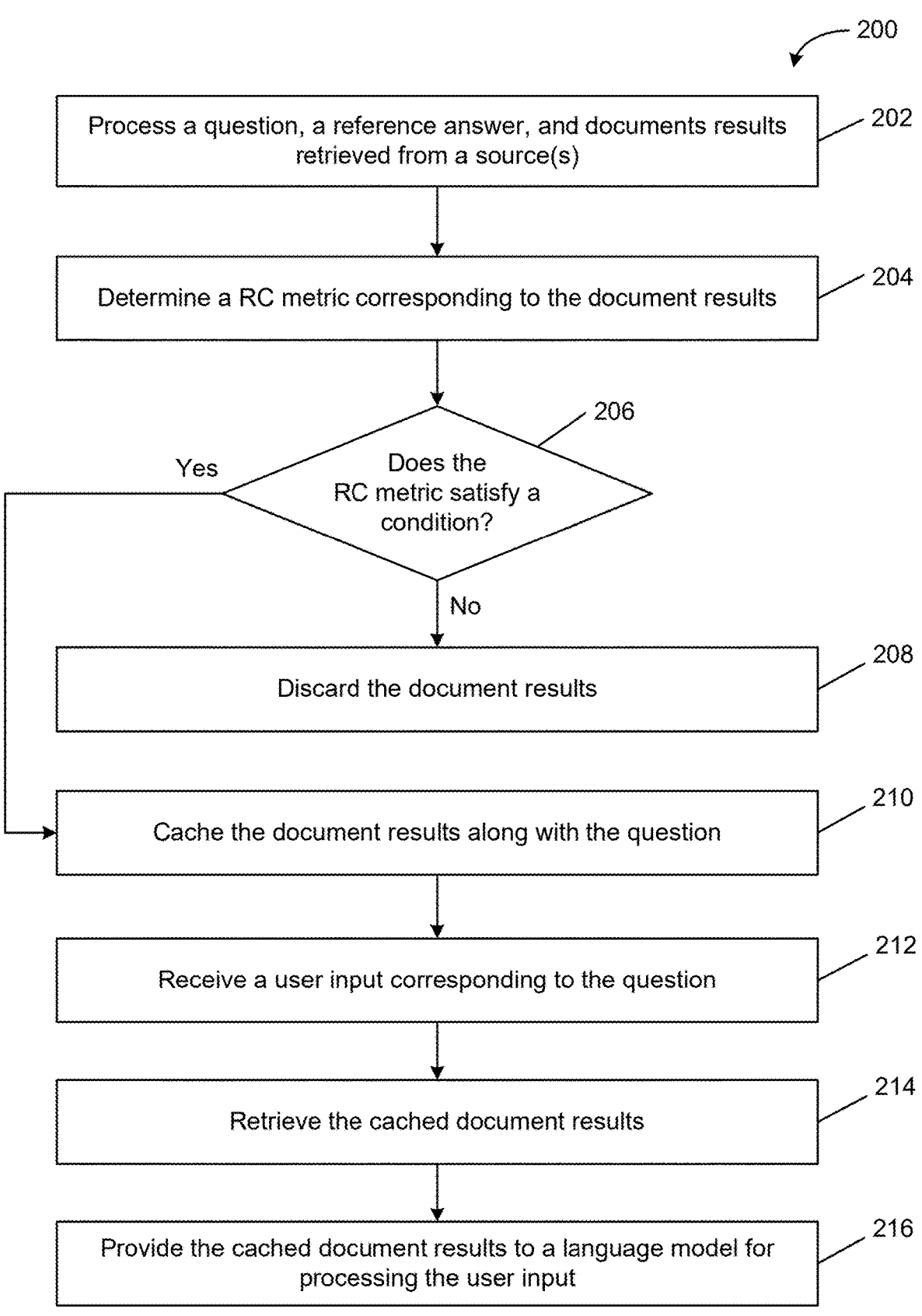

200

Process a question, a reference answer, and documents results retrieved from a source(s) — 202

Determine a RC metric corresponding to the document results — 204

Does the RC metric satisfy a condition? — 206

Yes

No

Discard the document results — 208

Cache the document results along with the question — 210

Receive a user input corresponding to the question — 212

Retrieve the cached document results — 214

Provide the cached document results to a language model for processing the user input — 216

FIG. 3

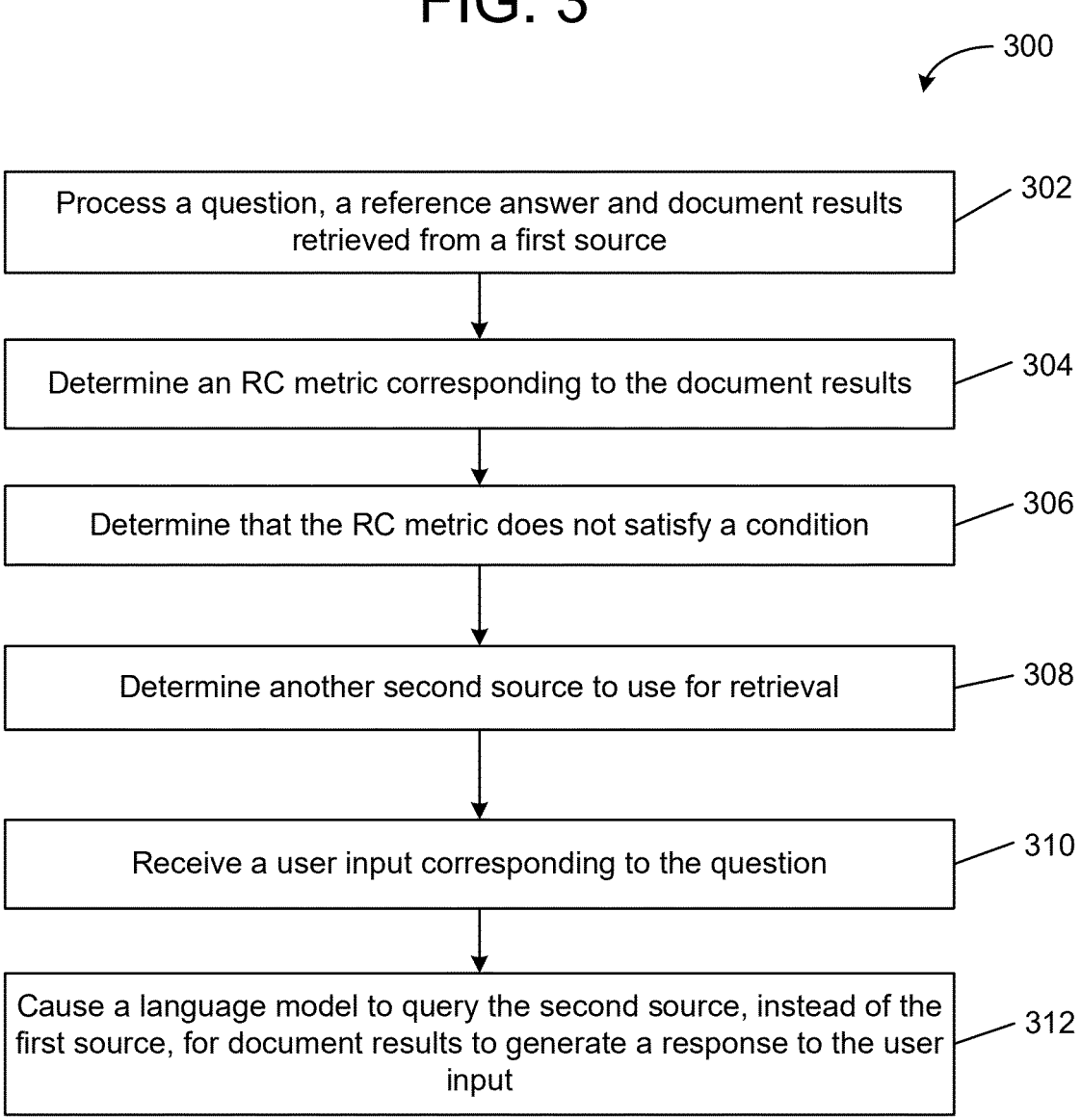

300

Process a question, a reference answer and document results retrieved from a first source   302

Determine an RC metric corresponding to the document results   304

Determine that the RC metric does not satisfy a condition   306

Determine another second source to use for retrieval   308

Receive a user input corresponding to the question   310

Cause a language model to query the second source, instead of the first source, for document results to generate a response to the user input   312

FIG. 6

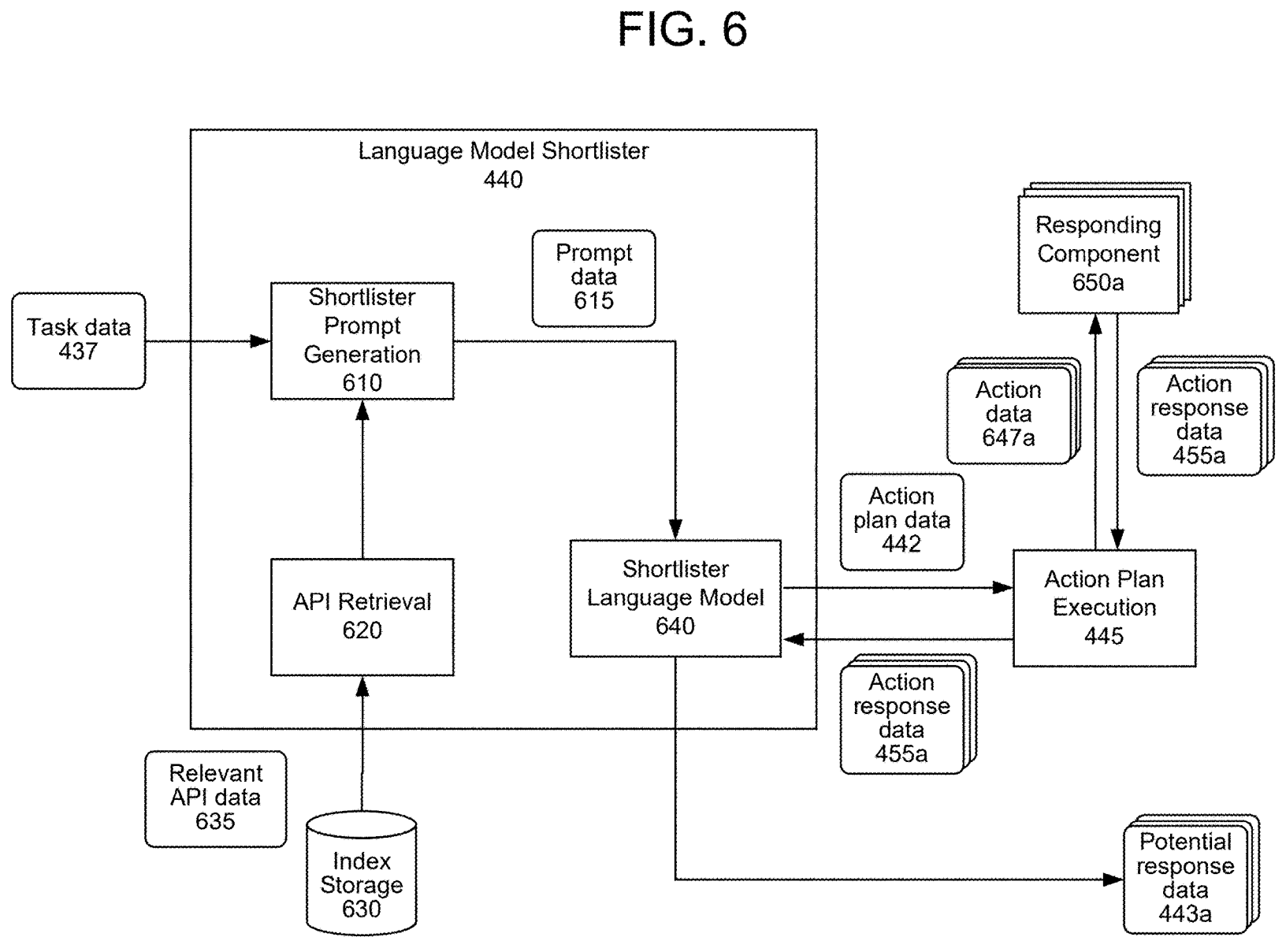

Language Model Shortlister 440

Task data 437

Shortlister Prompt Generation 610

API Retrieval 620

Index Storage 630

Relevant API data 635

Prompt data 615

Shortlister Language Model 640

Potential response data 443a

Action plan data 442

Action response data 455a

Action Plan Execution 445

Action data 647a

Responding Component 650a

Action response data 455a

Figure 10:
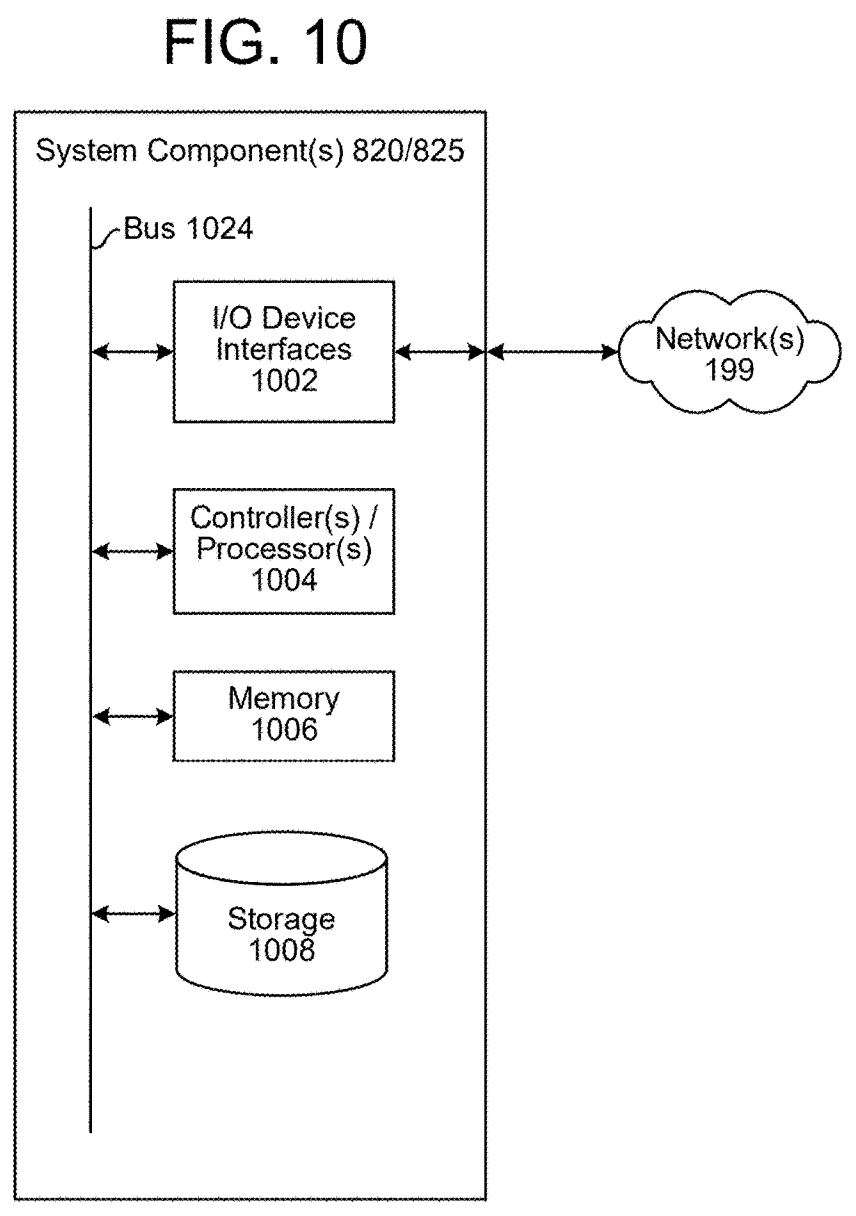

Network(s) 199

System Component(s) 820/825

Bus 1024

I/O Device Interfaces 1002

Controller(s) / Processor(s) 1004

Memory 1006

Storage 1008

EVALUATING RETRIEVAL SYSTEM FOR LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating example components of a system for evaluating a retrieval system for a language model, according to embodiments of the present disclosure.

FIG. 2 is a flowchart illustrating an example process for using a retrieval complexity (RC) metric for caching retrieved documents for processing a subsequently received input, according to embodiments of the present disclosure.

FIG. 3 is a flowchart illustrating an example process for using a RC metric to determine when another retrieval source is to be used, according to embodiments of the present disclosure.

FIG. 6 is a conceptual diagram illustrating example components and processing of a language model shortlister component of the system, according to embodiments of the present disclosure.

FIG. 9 is a block diagram conceptually illustrating example components of a device, according to embodiments of the present disclosure.

FIG. 10 is a block diagram conceptually illustrating example components of a system, according to embodiments of the present disclosure.

DETAILED DESCRIPTION

Figure 4:
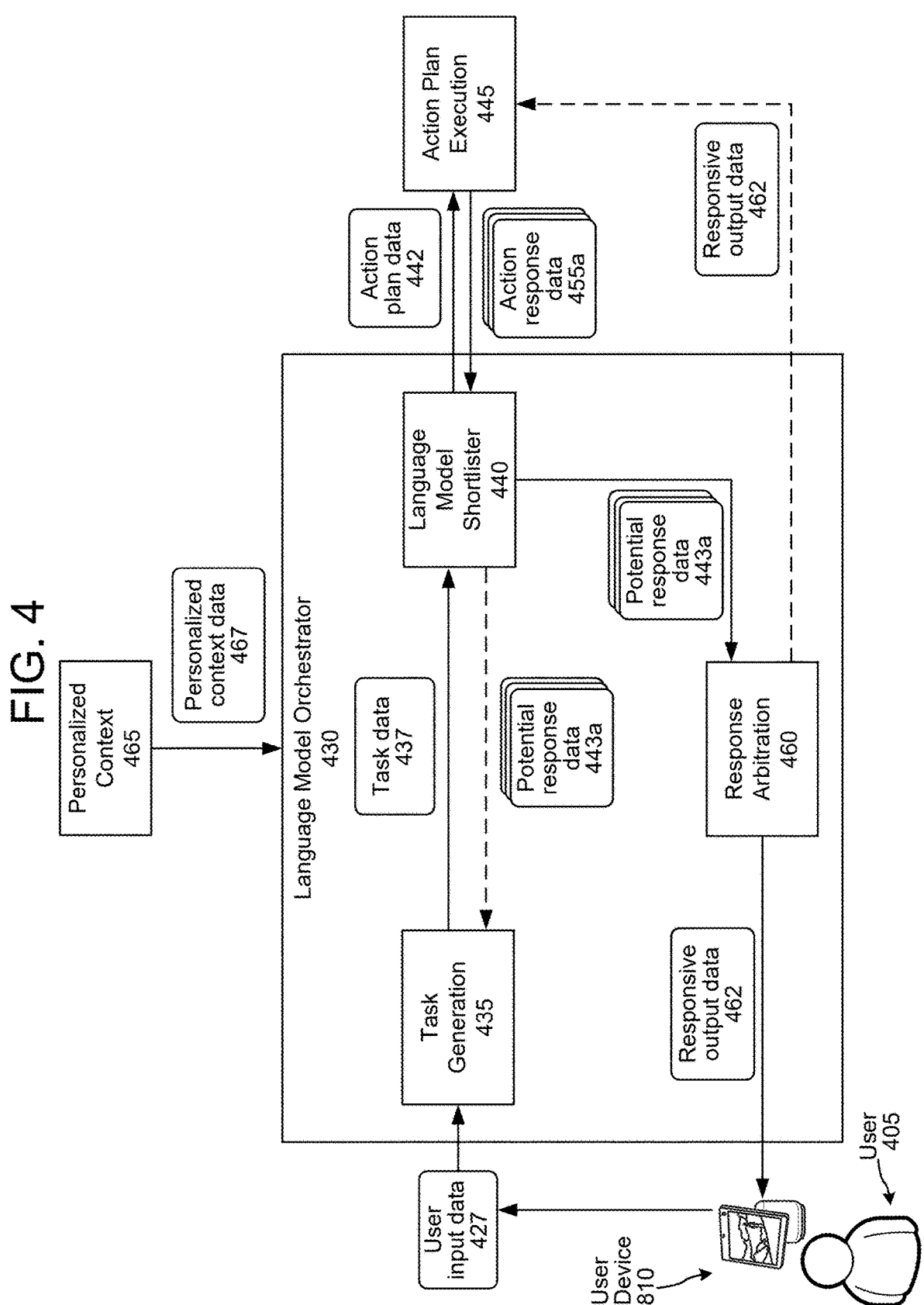
FIG. 4 is a conceptual diagram illustrating example components and processing of a system configured to use a language model(s) to determine a response to a user input, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. Speech-to-speech is a field of computer science, artificial intelligence, and linguistics in which embedding data is generated to represent speech in audio data and, using one or more models, the embedding data is processed to generate audio data and/or a system command (e.g., an application programming interface (API) call) responsive to the speech.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein below) may be the same language model.

An artificial intelligence (AI) system may use ASR, NLU, NLG, and/or TTS, each with and/or without a language model, for processing user inputs, including natural language inputs (e.g., typed and spoken inputs) and other type of inputs (e.g., inputs not received from a user, inputs received from a system component, inputs representing occurrence of events, etc.).

In some embodiments (e.g., where one or more of the language models are LLMs), the one or more language models may be transformer-based sequence-to-sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. Example of such language models includes Amazon Alexa and AWS Titan family of generative models.

In other embodiments (e.g., where one or more of the language models are an LLM), the one or more language models may be a decoder-only architecture. The decoder-only architecture may use left-to-right (unidirectional) encoding of the input (e.g., audio, text, image, video, etc.). Examples of such language models include others in the Amazon Alexa and Amazon Web Services (AWS) Titan family of models as well as the Generative Pre-trained Transformer 3 (GPT-3) and other versions of GPT. GPT-3 reportedly has a capacity of (approximately) 175 billion machine learning parameters. GPT-4 reportedly has a capacity of (approximately) 1.76 trillion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

Other types of generative models may be used to process data including different types of data (e.g., multi-modal data). Example generative models may include text-to-image models, audio-to-text models, image-to-text models, text-to-audio models, image generative models that receive multi-modal data, audio generative models that receive multi-modal data, and the like. For example, a generative model may receive and process text data (e.g., describing a desired image) and image data (e.g., exemplar images) and may generate image data corresponding to the text data. As another example, a generative model may receive audio data including speech and may generate text data representing a transcript of the speech, a text summary of the speech, etc.

In some embodiments, the input to the language model (or other types of generative models) may be in the form of a prompt. A prompt may be a natural language input, for example, a directive or request, for the model to generate an output according to the prompt. The output generated by the model may be a natural language output responsive to the prompt. In some embodiments, the output may additionally or instead be another type of data, such as audio, image, video, etc. The prompt and the output may include text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user that are open at the time of the user prompt.

In some embodiments, Retrieval-Augmented Generation (RAG) techniques may be used to augment a generative model's processing. RAG is the process of optimizing the output of a generative model, so that the model references an authoritative knowledge base outside of its training data sources before generating a response. As described herein, language models are trained on vast volumes of data and use large numbers (for example, billions) of parameters to generate original output for tasks like answering questions, translating languages, and completing sentences. RAG can extend the already powerful capabilities of language models to specific domains or particular knowledge bases (e.g., a system's particular knowledge, an organization's internal knowledge base, etc.) by providing non-parametric knowledge/memory for the language model. RAG can be a cost-effective and computationally efficient approach to improving a model output so the generative model remains relevant, accurate, and useful in various contexts.

The present disclosure relates to techniques for determining whether content retrieved using, for example RAG techniques, is sufficient for a generative model, such as a language model, to generate a response to an input. Techniques of the present disclosure are applicable to a question-answering system and similar techniques can be applied to other types of systems. When retrieved content is sufficient, RAG significantly increases the accuracy of these systems; when retrieved content is insufficient, RAG can decrease both the efficiency and accuracy of the system. Determining when to use RAG is a challenging task. Some techniques involve classifying user requests before receiving and without retrieved content. Such request-only classifications may be insufficient for generative model-based systems. Whether or not retrieved content is appropriate may be dependent on the nature of a given input, the coverage of external knowledge source(s), and the performance (e.g., search techniques, retrieval model, etc.) of the retrieval system(s).

As used herein, a RAG technique or retrieval system refers to a retrieval mechanism and a retrieval source. The retrieval mechanism may include a retrieval algorithm, a search algorithm, etc. used to determine results, corresponding to an input, from the retrieval source. The retrieval source may include information, knowledge data, etc. from which content/results are retrieved. Example of a retrieval mechanism includes a neural-based search technique. In examples, the retrieval source may include an index storage or other structured storage.

In some embodiments, a system of the present disclosure is configured to determines a retrieval complexity (RC) metric to measure the suitability of retrieved content for a reference answer input, conditioned on an input (e.g., a user request or query) and the content retrieved from one or more sources. In some embodiments, the RC metric is based on an answerability metric representing that a single retrieved document can be used to generate the reference answer and a completeness metric representing that the set of retrieved documents is "complete". A set of documents may be considered complete when the information required to generate the reference answer is contained in this set (e.g., two or mode documents may be used to generate the reference answer). The answerability metric estimates the degree that each individual retrieved document contains sufficient information to answer the question, while the completeness metric estimates the degree that the set of retrieved documents contains sufficient information to answer the question. Inputs with high answerability and high completeness may have a high RC metric and are considered suitable for RAG techniques; inputs that have low answerability and/or low completeness may have a low RC metric and may thus be less suitable for RAG techniques.

In some embodiments, the system compares the relevance of retrieved external knowledge to the user request. The system may retrieve document results (e.g., websites, records from knowledge bases, excerpts from old/permitted books, etc.) for the input request, may examine the retrieved document results using a reference-based evaluation system, may compute the answerability metric (the probability that an individual retrieved document contains the correct answer, may compute the completeness metric (the metric that the retrieved documents cover all information required to satisfy the input request, and may compute the RC metric based on the answerability metric and completeness metric of the retrieved document results. In example embodiments, the RC metric may be a weighted sum of the answerability metric and the completeness metric.

In some embodiments, the RC metric can be used as a control mechanism to determine when retrieved content is to be used by a generative model. The RC metric can increase the accuracy while decreasing cost and latency of a generative model based system. The RC metric can be used to reduce the rate of often RAG techniques are used, in particular when no relevant information is obtained from external sources.

In some embodiments, the RC metric can be used to identify inputs (e.g., user requests) for which no relevant external knowledge is found, which can identify knowledge gaps within a retrieval system and enable updating of the retrieval system accordingly.

In some embodiments, the RC metric can be used to identify questions that are complex and difficult for a language model to answer and the identified questions can be used to develop training datasets for the language model (e.g., for supervised finetuning, for configuring a next version of the language model, etc.).

Teachings of the present disclosure provide, among other things, techniques to improve processing by generative model based systems. The RC metric can be used to improve accuracy and reduce cost and latency in a RAG architecture.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1:
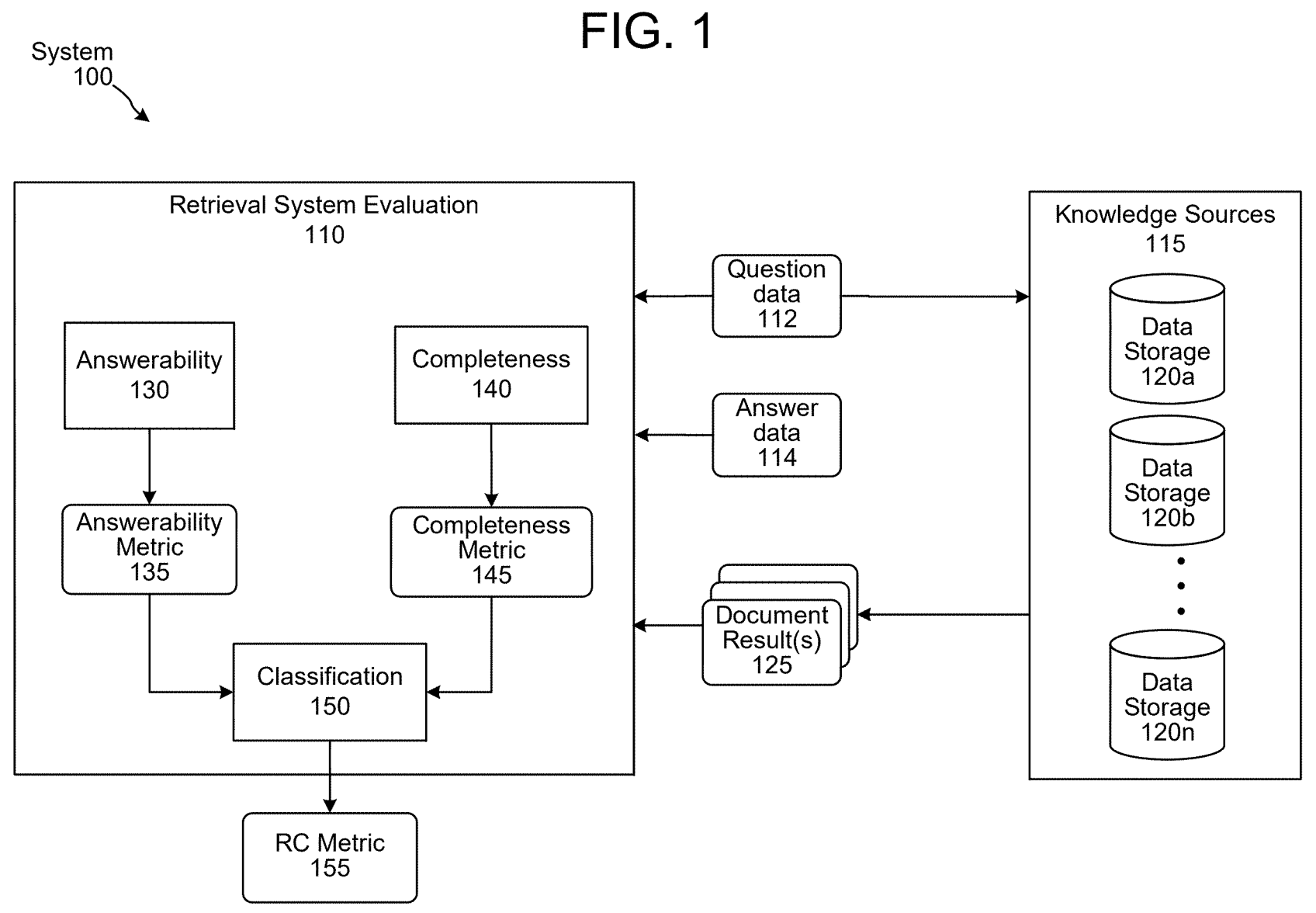

FIG. 1 is a conceptual diagram illustrating example components of a system 100 for evaluating a retrieval system for a language model, according to embodiments of the present disclosure. In some embodiments, the system 100 may include a retrieval system evaluation component 110 and one or more knowledge sources 115. The knowledge sources 115 may include or may be in communication with multiple different data storages 120a-120n. A knowledge source may be configured to provide, via the data storage(s) 120, external or non-parametric knowledge for a language model. Examples of knowledge sources 115 may include a web search engine, a knowledge base (e.g., a music knowledge database, a movie knowledge database, historical figures database, etc.), and the like. In some embodiments, the knowledge sources 115 may be accessed via an application programming interface (API). In some embodiments, the knowledge sources 115 may be one of the responding components 650 described in relation to FIG. 6. One or more document results may be retrieved from the knowledge sources 115 in response to a query. In other embodiments, the document results may be retrieved from another type of responding component 650, such as a skill component, an application (or app), a question-answering system, etc.

The retrieval system evaluation component 110 may be configured to determine a retrieval complexity (RC) metric 155 corresponding to content retrieved from the knowledge sources 115 based on a question (e.g., question data 112) and reference answer (e.g., answer data 114). In some embodiments, the RC metric 155 may be based on a complexity of the question and the retrieval system evaluation component 110 may be configured to, among other things, classify questions as being challenging for a language model to answer. A question may be classified as challenging when the retrieved content/document results is incomplete (e.g., part of the answer is not included in or missing from the retrieved content, part of the answer cannot be derived from the retrieved content, and the like) or when the retrieved content does not include any relevant information (e.g., no portion of the answer is included in the retrieved content, no portion of the answer can be derived from the retrieved content, and the like). On the other hand, if the retrieved content is complete and is relevant (e.g. the answer is included in the retrieved content, the answer can be derived from the retrieved content, and the like) the question is classified as not challenging (e.g., easy) for the language model to answer.

Examples of complex questions include multi-hop questions that require at least two reasoning steps to answer. Other examples of complex questions include questions that have a high compositional complexity, which refers to the degree that the answer must be composed from multiple pieces of evidence.

A question can be considered complex for retrieval augmentation if the question cannot be answered by extracting a snippet from a retrieved document. This dimension of complexity can occur for multiple reasons, such as if the answer requires multiple reasoning steps or composition of supporting facts are spread across retrieved content. Retrieval complexity can occur when multiple pieces of information must be combined in a complex fashion to generate the correct answer, such as reasoning, comparison, or composition over multiple facts. Multiple factors can increase the retrieval complexity, including index/knowledge coverage, retrieval quality, and question syntax, as each plays a role in determining whether a document result containing a snippet that answers the question is retrieved.

For example, answering the question "are lions bigger than tigers?" requires a comparison between two related entities. While this question could be considered complex, the close relation of lions and tigers increases the probability that a single retrieved result talks about the size of both animals, and thus, the retrieval system evaluation component 110 may classify the question "are lions bigger than tigers?" (based on a reference answer and retrieved content) as not challenging to answer. As another example, answering the question "are lions bigger than freezers?" requires a comparison between two unrelated entities. The probability that a single retrieved result includes information regarding both entities is low and answering the question likely requires at least one result including information on lions and at least another result including information on freezers. In this case, the retrieval system evaluation component 110 may classify the question "are lions bigger than freezers?" as challenging to answer. In some embodiments, when the retrieved content does not include information on one of the entities, either lions or freezers, or does not include relevant information for one of the entities, either the measurements of lions or measurements of freezers, then the retrieval system evaluation component 110 may determine the RC metric 155 to indicate that the language model will be unable to respond to the question.

As shown in FIG. 1, in some embodiments, the retrieval system evaluation component 110 may include an answerability component 130, a completeness component 140 and a classification component 150. The retrieved system evaluation component 110 may receive and process question data 112, answer data 114 and one or more document results 125.

The question data 112 may be text, tokens, or other natural language representation of a question that, for example, is to be processed using a language model. The question data 112 may be based on a user input, received by the system 100, that included the question. In some cases, the question data 112 may be based on an input generated by a system component (e.g., a system component 820). The question data 112 may be retrieved from a data storage that may store past user inputs, past system-generated inputs, etc. In some cases, the question data 112 may be determined based on a currently received user input (e.g., user input data 427) or an input currently generated by a system component.

The answer data 114 may be text, tokens, or other natural language representation of an answer corresponding to the question data 112. The answer data 114 may represent, in some cases, a reference answer or ground truth answer for the question data 112. The answer data 114 may be determined manually (e.g., a user such as model developer, system administrator, or the like may input the answer) or may be determined by a system component (e.g., using a question-answering system, a machine learning model, etc.). In other cases, as described below, the answer data 114 may represent an answer generated by a language model in response to the question data 112.

In some embodiments, the answer data 114 may include more than one answer (e.g., multiple reference answers) that may correspond to the question data 112. The retrieval system evaluation component 110 may be capable of determining the RC metric 155 for generative QA domains (that use generative models to generate responses), where a generated response to a given input may be different in different instances or for when the original question allows multiple correct answers.

The document result(s) 125 may correspond to the question data 112 and may be retrieved from the knowledge sources 115 using the question data 112. A request (e.g., a query) based on the question data 112 (e.g., including the question data 112) may be sent to the knowledge sources 115 (e.g., via an API), and in response to the request, the knowledge sources 115 may provide the document result(s) 125. The document results 125 may be portions/excerpts of websites, old/permitted books, knowledge graphs/bases, and the like. The document results 125 may be different type of results (e.g., a first document result 125 may be a website, a second document result 125 may be a knowledge graph, etc.). In some embodiments, the document result(s) 125 may be text, tokens or other natural language representation of search results corresponding to the question data 112. The document result(s) 125 may represent retrieval knowledge based on RAG techniques for providing information to a language model.

The document results 125 may be retrieved by a particular retrieval system from its retrieval source/data storage 120. The retrieval system may use a particular retrieval technique (e.g., a retrieval or search algorithm) to determine the document results 125 corresponding to the question data 112.

One or more components of the retrieval system evaluation component 110 may use multiple reference answers to determine the RC metric 155 to cover different types of questions (e.g., questions with diverse answers, opinion-based questions, ambiguous questions, etc.). In some embodiments, the retrieval system evaluation component 110 uses semantic measures to determine an answerability metric and completeness metric for a more robust RC metric, instead of using exact matching or token/segment level similarity which can fail to capture semantic coherence between entities/concepts of the answer sentence and question. The retrieval system evaluation component 110 can be used to evaluate systems that generate complete sentence-form answers.

The answerability component 130 may be configured to determine an answerability metric 135 representing that the answer data 114, corresponding to the question data 112, can be determined using a single document result 125. In some embodiments, the answerability component 130 may be configured to estimate the answerability of a generated answer given one or more reference answers. For the question data 112 (noted as Q), a document result 125 of the retrieved results (noted as $d_i \in D$) and a set of reference answers in the answer data 114 (noted as $R=\{r_0, r_1, \ldots, r_k\}$), the answerability component 130 may assess the correctness of the document result $d_i$ for answering the question Q. The answerability component 130 may determine an answerability metric for each individual document result 125. The answerability component 130 may, in some embodiments, use a condition (e.g., a threshold answerability value) to determine the answerability metric 135. If the probability (noted as $s_i$) of a document result 125 being sufficient for answering the question data 112 satisfies the condition (e.g., exceeds a threshold answerability value), then the answerability metric 125 may be "yes", "true" or other value indicating that the question data 112 is answerable using the corresponding document result 125. If the probability of a document result 125 being sufficient for answering the question data 112 fails to satisfy the condition (e.g., is below a threshold answerability value), then the answerability metric 125 may be "no", "false" or other value indicating that the question data 112 is not answerable using the corresponding document result 125. The condition (the threshold answerability value) is configurable and may be configured based on a retrieval system being evaluated, a language model included in the RAG architecture, how factual versus creative the language model generated answer can be, desired system configurations, etc.

For example, an answerability function $Ans(S_D)$ may be defined as follows:

$$Ans(S_D) \begin{cases} 0 \text{ if } \max(s_i \in S_D) < T_{ans} \\ 1 \text{ if } \exists \ s_i \in S_D \geq T_{ans} \end{cases} \qquad \text{Equation (1)}$$

where $S_D$ represents an answerability metric for the entire set of document results 125, $T_{ans}$ represents the condition (threshold value) used to discriminate between not answerable questions when $s_i < T_{ans}$ and answerable questions when $s_i \geq T_{ans}$. In some embodiments, the answerability metric 135 may correspond to the entire set of document results 125 and may be determined (as indicated in Equation 1) using the highest probability of the question data 112 being answerable using the one document result 125 associated with the highest probability and determining whether the highest probability satisfies the threshold value. In other words, the answerability metric 135 corresponding to the document results 125 may be affirmative based on at least one of the document results 125 including the answer data 114 or including relevant information that can be used to generate the answer data 114.

In other embodiments, the answerability metric 135 may include the probabilities associated with each of the document results 125 and the classification component 150 may process these probabilities to determine the RC metric 155.

In some embodiments, the answerability component 130 may use a machine learning model configured as an automatic evaluator for determining whether the document results 125 correspond to (e.g., are relevant for) the question data 112 or the answer data 114. In example embodiments, the machine learning model may be a supervised transformer language model encoder that may be trained using multiple reference answers by combining multiple correct and incorrect answers to assign a correctness score for an answer to a question. The trained model may be considered a reference-based evaluator. During training, the model may learn to minimize the semantic distance between a correct target answer, from the reference answers, and maximize the semantic distance from the set of incorrect reference answers. The trained model may process the question included in the question data 112 and the reference answer(s) included in the answer data 114 to determine a correctness score for the document result 125 having an answer to the question (where the correctness score may be determined based on portions/tokens included in the document result 125 representing the answer).

The completeness component 140 may be configured to determine a completeness metric 145 representing that the answer data 114, corresponding to the question data 112, can be determined using two or more of the document results 125. The completeness component 140 may determine that the information required to answer the question data 112 (or generate the answer data 114) is spread among different documents in the set of document results 125. For example, a document result 125 may be partially relevant to the question, yet contain insufficient information to generate the correct answer. To perform this estimation, the completeness component 140 may compute the entropy of the relevance of each document result 125 in the retrieval batch $d_i \in D$ with each token in the question data 112. For example, given the question "are lions bigger than tigers?", it can be expected that document results discussing lions are more relevant to the portion of the question referring to lions, and document results discussing tigers are more relevant to the portion of the question referring to tigers. Based on this notion of relevance, the completeness component 140 can approximate whether knowledge relevant to each portion of the question data 112 is present in the set of document results 125.

In some embodiments, the completeness component 140 may be configured to generate a distinct attention distribution for each document result 125 in the entire set (noted as D) in view of the question data 112 (noted as Q). The distributions may be organized into a matrix M of size $|D| \times |Q|$, where each row may represent the token $t_j$ from the question data 112 and the columns may indicate the relevance Rel $(d_i, t_j)$ of each document $d_i$ to those tokens. To ensure comparability, in some embodiments, the completeness component 140 may normalize the entropies for each document result and compute the average normalized entropy to obtain the completeness score $S_D$:

$$S_D = \frac{\sum_{i=1}^{|D|} \left\| \sum_{j=1}^{|Q|} Rel(d_i, t_j) \right\|}{|D|} \qquad \text{Equation (2)}$$

In some embodiments, the completeness component 140 may be configured to use a condition (e.g., a threshold completeness value) to determine the completeness metric 145. If the completeness score (noted as $S_D$) corresponding to the set of document results 125 satisfies the condition (e.g., exceeds a threshold completeness value), then the completeness metric 145 may be "yes", "true" or other value indicating that the answer data 112 can be generated using two or more of the document results 125. If the completeness score corresponding to the set of document results 125 fails to satisfy the condition (e.g., is below a threshold completeness value), then the completeness metric 145 may be "no", "false" or other value indicating that the answer data 114 cannot be generated using the set of document results 125.

For example, a completeness function $Com(S_D)$ may be defined as follows:

$$Com(S_D)\begin{cases} 1 & \text{if } S_D \geq T_{com} \\ 0 & \text{if } S_D < T_{com} \end{cases} \qquad \text{Equation (3)}$$

where $T_{com}$ is the threshold completeness value.

The condition (the threshold completeness value) is configurable and may be configured based on a retrieval system being evaluated, a language model included in the RAG architecture, how factual versus creative the language model generated answer can be, desired system configurations, etc.

In some embodiments, the completeness component 140 may use a machine learning model configured as an automatic evaluator for determining whether the document results 125 correspond to (e.g., are relevant for) the question data 112 or the answer data 114. In example embodiments, the machine learning model may be the same or similar to the machine learning model used by the answerability component 130. The trained model may process the question included in the question data 112 and the reference answer(s) included in the answer data 114 to determine a correctness score for the entirety of the document results 125 having an answer to the question (where the correctness score may be determined based on portions/tokens included in multiple document results 125 representing the answer).

The classification component 150 may be configured to determine the RC metric 155 based on the answerability metric 135 and the completeness metric 145, for example, by combining the answerability metric 135 and the completeness metric 145. The classification component 150 may determine the RC metric 155 to represent whether or not the question data 112 is complex. A language model may be unable to generate an answer to a complex question based on retrieved content. The classification component 150 may determine the RC metric 155 to indicate that the question is complex (e.g., RC metric 155 may be "complex") based on the question data 112 being unanswerable with a single document result 125 and the set of document results 125 being incomplete to determine the answer data 114 (e.g., the answerability metric 135 indicates unanswerable and the completeness metric 145 indicates incomplete). The classification component 150 may determine the RC metric 155 to indicate the question is not complex (e.g., RC metric 155 may be "not complex") based on the question data 112 being answerable with a single document result 125 or the set of document results 125 is complete to determine the answer data 114 (e.g., the answerability metric 135 indicates answerable or the completeness metric 145 indicates complete).

In some cases, the RC metric 155 corresponding to the document results 125 may represent that the retrieval system, including the retrieval source and the retrieval technique, is sufficient (can be used) to determine an answer to the question data 112. The retrieval system evaluation component 110 may evaluate a retrieval system's knowledge source/available content as well as the retrieval system's retrieval technique (e.g., retrieval or search algorithm).

In some embodiments, the classification component 150 may determine the RC metric 155 based on a weighted sum or weighted average of the answerability probability(ies) of one or more of the document results 125 and the completeness score for the set of document results 125. In such embodiments, the answerability metric 135 may include the answerability probabilities for each document result 125 and the completeness metric 145 may include the completeness score 145 for the set of document results 125.

The retrieval system evaluation component 110, in some embodiments, uses reference answers included in the answer data 114 to determine the RC metric 155. Use of multiple reference answers may be helpful in various cases. For example, consider an example question "Is the president of the [country] a good leader?", for which example reference answers may be "yes", "The president of the [country] is [name]. [Name] is considered a good leader because of . . . ", "[Name] is not considered a good leader by [certain people] of the country", and the like. In other words, the example question may have multiple good/accurate reference answers. The retrieval system evaluation component 110 may determine the RC metric 155 based on the document results 125 being sufficient to determine at least one of the reference answers. In some embodiments, the retrieval system evaluation component 110 may determine the RC metric 155 conditioned on the question, such that the RC metric 155 represents that the document results 125 is sufficient to determine the "best" reference answer for the question. Continuing with the above example question, an answer including the president name may be considered better than an answer simply including "yes" or "no".

The retrieval system evaluation component 110 described herein can provide, among other things, robust techniques for evaluating certain situations. Such situations may include types of questions that may have multiple and diverse correct/reference answers. For example, the question "what is a band?" can be correctly answered by both "a flat, thin strip or loop of material, used as a fastener" and "a band is a group of people who perform instrumental and/or vocal music." Such situations further include knowledge seeking questions that may have pieces of relevant information spread across multiple references. For example, a question "who is [person]?" can be answered by combining information across multiple reference answers/retrieved content. Such situations further include ambiguous/under-specified questions that do not have a single correct answer or opinion seeking questions, where using a single retrieved document result may be limiting and may provide an incorrect evaluation of the retrieval system.

In some embodiments, the system 100 may implement one or more retrieval techniques to retrieve the document results 125 from the knowledge sources 115 based on the question data 112. In example embodiments, a retrieval technique, used in particular for question-answering systems, may involve using an unsupervised scoring function based on a sparse bag-of-words representation of text. In other example embodiments, a supervised retrieval technique may be used that computes an approximate nearest-neighbor score on dense representations of questions (or other types of inputs) and document results. In other example embodiments, retrieval techniques may involve machine learning models trained to learn a sparse representation of document results conditioned on relevant questions or other types of inputs.

The system described in relation to FIG. 1 is an unsupervised system and thus can be used to measure an RC metric for arbitrary unseen question-answering systems. In other words, the system described herein can be used with any RAG/retrieval techniques or any type of language model or other type of model configured to generate a response to a question.

Similar techniques can be used to evaluate a retrieval system for inputs other than questions, where the system may determine whether retrieved content is sufficient for a language model to generate a response for a given input.

In non-limiting examples, the retrieval system evaluation component 110 may evaluate a retrieval system for a language model described in relation to FIGS. 4-7 below. For example, the retrieval system evaluation component 110 may be used to evaluate an API retrieval component 620 for a shortlister language model 640. As another example, in example embodiments, the personalized context component 465 may implement RAG techniques and the retrieval system evaluation component 110 may be used to evaluate the personalized context component 465 for the language model orchestrator 430.

In non-limiting example embodiments, the system 100 may use the language model orchestrator 430 (shown in FIG. 4) to process an input (e.g., a question) to determine a response (e.g., an answer) using retrieved content. In such embodiments, the language model orchestrator 430 may receive content (e.g., determined using RAG techniques) from one or more responding components 650 (shown in FIG. 6). The retrieved content may be the document results 125 and may be evaluated by the retrieval system evaluation component 110 as described in relation to FIG. 1. The system 100 may perform additional operations based on the retrieval system evaluation component 110 determining a RC metric for the retrieved content to be used by the language model orchestrator 430.

FIG. 2 is a flowchart illustrating an example process 200 for using the RC metric 155 for caching retrieved documents for processing a subsequently received input, according to embodiments of the present disclosure. At a step 202, of the process 200, the retrieval system evaluation component 110 may process a question (e.g., question data 112), a reference answer (e.g., answer data 114) and document results (e.g., document results 125) retrieved from one or more sources (e.g., knowledge sources 115). The retrieval system evaluation component 110 may perform one or more of the operations described above in relation to FIG. 1. At a step 204, the retrieval system evaluation component 110 may determine a RC metric (e.g., RC metric 155) corresponding to the document results. The RC metric 155 may represent whether or not an answer for the question can be determined using the retrieved document results, where the answer may be similar to a reference answer provided to the retrieval system evaluation component 110. As described in relation to FIG. 1, the RC metric 155 may be based on an answerability metric 135 (representing, for example, whether a single document result can be used to determine the reference answer) and a completeness metric 145 (representing, for example, whether two or more of the document results can be used to determine the reference answer).

At a decision step 206, the system 100 may determine whether the RC metric 155 satisfies a condition. In example embodiments, the condition may relate to whether the document results 125 be used to determine the answer data 114 for the question data 112. In some embodiments, the RC metric 155 may be a Boolean value of "complex" or "not complex", where "complex" indicates that the question data 112 cannot be answered using the document results 125, while "not complex" indicates that the question data 112 can be answered using the document results 125. At the step 206, if the system determines that the RC metric 155 indicates that the question cannot be answered using the document results 125, then at a step 208, the system may discard the document results 125. By discarding, the document results 125 may not be used by the language model to generate a response to an input corresponding to the question data 112. In other embodiments, the document results 125 may be used for further analysis, for example, to evaluate a deficiency in the document results 125 for determining the answer data 114, for determining training data or other configuration data with respect to the retrieval system or knowledge source 115, etc.

At the step 206, if the system determines that the RC metric 155 indicates that the question can be answered using the document results 125, then at a step 210, the system may cache the document results 125 along with the question data 112. For example, the document results 125 may be stored, in a data storage, associated with a cache key that may be determined based on the question data 112.

At a step 212, the system may receive a user input corresponding to the question. In example embodiments, the user input may be user input data 427 shown in FIGS. 4-7. The system may determine that the user input corresponds to the question data 112 by determining that the user input is the same or similar to the question of the question data 112. The system may determine that the user input is semantically similar to the question data 112 using, for example, cosine distance similarity between an embedding for the user input and an embedding for the question data 112. Other techniques may be used to determine that the user input is similar to the question data 112.

At a step 214, the system may retrieve the cached document results. The system may use the user input or the question data 112 as a key to perform a lookup of the document results associated with the question data 112. At a step 216, the system may provide the cached document results to a language model for processing the user input. The language model may use the document results to generate a response to the user input. In this manner, the previously stored document results can be used to respond to a subsequently received user input, without having to perform retrieval operations for retrieving relevant document results for the user input. This results in savings in terms of computational cost and time (e.g., not performing retrieval operations).

In example embodiments, the system may provide the cached document results to a language model orchestrator 430. The language model orchestrator 430 may determine a prompt based on the user input/user input data 427 and including the document results, the prompt may be processed by a language model (e.g., task determination language model 520, task selection language model 540, shortlister language model 640, response language model 720, etc.) to determine a response to the user input.

In some embodiments, the techniques described in relation to FIG. 1 can be used to determine when a retrieval source is not sufficient to determine a response to a question and thus another retrieval source can be used for the question. FIG. 3 is a flowchart illustrating an example process 300 for using a RC metric to determine when another retrieval source is to be used, according to embodiments of the present disclosure. At a step 302, the retrieval system evaluation component 110 may process a question (e.g., question data 112), a reference answer (e.g., answer data 114) and document results (e.g., document results 125) retrieved from a first source (e.g., one of the knowledge sources 115 or one of the data storages 120) as described in relation FIG. 1. At a step 304, the retrieval system evaluation component 110 may determine an RC metric (e.g., the RC metric 155) corresponding to the document results 125 as described in FIG. 1.

At a step 306, the system may determine that the RC metric 155 does not satisfy a condition. The condition may be related to the document results 125 being able to be used to determine an answer to the question data 112. As described herein, the RC metric 155 may classify the question data 112 as "complex" or "not complex." Based on the RC metric 155 classifying the question data 112 as "complex", the system may determine that the condition, of being able to use the document results 125 to answer the question data 112, is not satisfied.

At a step 308, in response to determining that the RC metric 155 does not satisfy the condition, the system may determine another second source to use for retrieval. For example, the system may determine that the first source does not have relevant or sufficient information related to the question data 112 and may determine that another second source may have relevant and sufficient information for the question data 112. The system may store data representing an association between the second source and the question data 112 and further representing that the second source is to be used for retrieval to answer a question corresponding to the question data 112.

At a step 310, the system may receive a user input corresponding to the question. In example embodiments, the user input may be user input data 427 shown in FIGS. 4-7. The system may determine that the user input corresponds to the question data 112 by determining that the user input is the same or similar to the question of the question data 112. The system may determine that the user input is semantically similar to the question data 112 using, for example, cosine distance similarity between an embedding for the user input and an embedding for the question data 112. Other techniques may be used to determine that the user input is similar to the question data 112.

At a step 312, the system may cause a language model to query the second source, instead of the first source, for document results to generate a response to the user input. In example embodiments, the language model may process the user input (e.g., a prompt based on the user input), the language model may be provided data representing that the second source is to be used for retrieval for the question data 112 (e.g., such data may be included in the prompt), and the language model may generate an output (e.g., an API call) to query the second source for information relevant to the user input. In this manner, the RC metric 155 can be used to determine that a particular retrieval source is insufficient and for subsequently received input another retrieval source can be used. This can result in savings in terms of computational cost and time (e.g., retrieval from the first/insufficient source can be skipped) and increase accuracy (e.g., document results from the first/insufficient source are not used by the language model).

In some embodiments, the system 100 may include a data storage (e.g., a retrieval system evaluation data storage) storing data representing an association between a retrieval source(s) and sample questions and/or question types. Using the retrieval system evaluation component 110, the system may determine RC metrics 155 corresponding to various questions (e.g., frequently received questions) and various retrieval systems. In cases where the RC metric 155 satisfies a condition and represents that the retrieved document results 125 from the retrieval system are sufficient to answer the question, the system may store data, in the retrieval system evaluation data storage, representing an association between the question and the retrieval system. In some embodiments, the data may represent an association between a question type and the retrieval system. The question type may be based on RC metrics 155 corresponding to multiple questions corresponding to the question type (e.g., music-related questions, general knowledge questions, geographical questions, historical questions, current events questions, etc.). The stored association may represent that the retrieval system is sufficient for generating an answer to the associated question. For example, the retrieval system evaluation data storage may include first data representing that a first question/first question type is associated with a first retrieval system, second data representing that a second question/second question type is associated with a second retrieval system, etc. Based on the data storage, the language model may be provided with a retrieval system (e.g., an identifier of the retrieval system) associated with a question/ question type of an input to be processed by the language model. Then the language model may use that retrieval system and use the retrieved content to generate a response to the input.

In this manner, the RC metric 155 can be used to determine which retrieval systems are sufficient for which questions and guide the language model in using the appropriate retrieval system. This can result in savings in terms of computational cost and time (e.g., avoid use of insufficient retrieval systems) and increase accuracy (e.g., use retrieved content from the appropriate retrieval system).

In example embodiments, the system may provide data representing that the second source is to be used for the question data 112 to the language model orchestrator 430. The language model orchestrator 430 may determine a prompt based on the user input/user input data 427 and the foregoing data, the prompt may be processed by a language model (e.g., task determination language model 520, task selection language model 540, shortlister language model 640, response language model 720, etc.) to determine a response to the user input.

In some embodiments, the language model orchestrator component 430 may generate prompt data representing a prompt for input to the language models. As shown in FIG. 4, the system component(s) 820 may receive user input data 427 from a user device 810 that may be operated by a user 405. In some instances, the user input data 427 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 430 receiving the user input data 427, another component (e.g., an automatic speech recognition (ASR) component 850) of the system

100 may receive audio data representing the user input. The ASR component 850 may perform ASR processing on the audio data to determine ASR data corresponding to the user input, which may correspond to a transcript of the user input. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 427).

In some embodiments, the language model orchestrator component 430 may receive other input data, which may be processed in a similar manner as the user input data 427 as described herein. The other input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 810, a user entering the home, etc.). In some embodiments, the system 100 may process such input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data (for example, "the kitchen timer expired"). The system 100 may process the input data (and/or natural language representation thereof) and may perform an action. For example, in response to detecting a garage door opening, the system 100 may cause garage lights to turn on, living room lights to turn on, etc. As another example, in response to detecting an oven beeping, the system 100 may cause a user device 810 (e.g., a smartphone, a smart speaker, etc.) to present an alert to the user. The language model orchestrator component 430 may process the input data to generate tasks that may cause the foregoing example actions to be performed.

The user input data 427 may be received at the task generation component 435 of the language model orchestrator component 430, which may be configured to generate a list of (e.g., one or more) tasks (e.g., steps/actions) that are to be completed in order to perform an action responsive to the user input and select a task from the list that is to be completed first (e.g., in a current iteration of processing by the system 100). For example, for a user input of "What is the weather for today," the task generation component 435 may generate a list of tasks of "(1) determine current outside temperature from thermostat; and (2) determine weather forecast for today" and select the task of "determine weather forecast for today" to be completed first. In instances where the task generation component 435 generates more than one task to be completed in order to perform the action responsive to the user input, the task generation component 435 may further maintain and prioritize the list of tasks as the processing of the system 100 with respect to the user input is performed. In other words, as the system 100 processes to complete the list of tasks, the task generation component 435 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 435 may process using language model(s) (e.g., LLMs). For example, the task generation component 435 may include a language model (e.g., an LLM) configured to generate the list of tasks that are to be completed in order to perform the action responsive to the user input and select a task of the list of tasks that is to be completed first. In some such embodiments, the user input data 427 may be received at a prompt generation component configured to generate a prompt for input to the language model of the task generation component 435. The prompt may include the user input data 427 (and/or a representation thereof) and various other information usable by the language model to generate the list of tasks that are to be completed in order to perform the action responsive to the user input. Such other information may include, for example, an indication of a remaining task(s) to be completed with respect to the user input, an indication of a potential response(s) associated with a completed task(s), and/or various contextual signals associated with the user input. The prompt may be a directive for the language model to determine the list of tasks given the information included in the prompt. The language model may process the prompt to generate the list of tasks.

The task generation component 435 may generate and send task data 437 representing the selected task to be completed and various other information needed to perform further processing with respect to the task (e.g., the user input data 427, an indication of the selected task, potential responses associated with previous tasks, the remaining task(s), and context data associated with the user input data 427, as described in detail herein) to the language model shortlister component 440.

Application programming interfaces (APIs) are a way for one program/component to interact with another. API calls are a mechanism by which they interact. An API call, or API request, is a message sent to a system component asking an API to perform an action, provide a service or information, or the like. An API call may be formatted for the particular API and may include a particular request, optionally using particular arguments and argument values. API calls may be used for a variety of purposes, such as controlling other devices (e.g., an API call of turn_on_device (device="indoor light 1") corresponds to a directive/request to a component to turn on a device associated with the identifier "indoor light 1"), obtaining information from other components (e.g., an API call of InfoQA.question ("Who is the president of USA?") corresponds to a directive/request to a component to find and provide an answer to the indicated question), and performing other actions (e.g., generating synthesized speech, searching data sources, etc.).

In some embodiments, the system may include an API retrieval component configured to receive a search query and output one or more API calls (or API data) matching the search query. API data may include an API call, API description, component description, and other information associated with the API/API call. In some embodiments, a language model of the system may generate an action to be performed with respect to the user input, where the action may be represented as an action description, an API, an API description, etc. Based on the generated action, the system may use the API retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), Airline-BookFlight ("departing airport code", "arrival airport code"), etc.). Based on the user input and other information (e.g., context data corresponding to the user input, user preferences, past user interactions, further information received from user, etc.), the system may select one or more of the determined API calls to execute.

The language model shortlister component 440 may be configured to determine one or more components (e.g., a responding component, APIs, skill component(s), language model (e.g., LLM) agent component(s), a TTS component, etc. as discussed herein) configured to perform an action related to the user input or the current task. The language model shortlister component 440 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include data regarding a potential action (e.g., a description of a potential action, such as turning on a light, booking a flight ticket, ordering a pizza, etc.) the components are configured to/will perform with respect to the user input or the current task. For example, for a current task of "determine weather forecast for today," the language model shortlister component 440 may generate requests of "use Weather Application A to determine weather forecast for today" and "use Weather Application B to determine weather forecast for today," or the like.

In some embodiments, the language model shortlister component 440 may process as described above using a language model(s) (e.g., LLMs). For example, the language model shortlister component 440 may include a language model (e.g., an LLM) configured to determine one or more components configured to perform an action related to the user input or the current task and cause the execution of a request(s) for the component(s) to provide a potential response(s) to the user input or current task. In some such embodiments, the task data 437 may be received at a prompt generation component configured to generate a prompt for input to the language model of the language model shortlister component 440. The prompt may include the task data 437 (and/or a representation thereof) and an indication of component(s) (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 442 sent to the action plan execution component 445. The action plan execution component 445 may identify the request(s) in the action plan data 442, generate executable API calls corresponding to the request(s), and cause the corresponding components (e.g., the responding component(s)) to generate action response data 455*a-n* representing the requested potential response(s), where individual action response data 455*a* may be provided by/correspond to a particular responding component. In some embodiments, the action response data 455*a-n* may include an identifier (e.g., a component name, an alphanumerical value associated with the component, etc.) for the component providing the data. The language model shortlister component 440 receives and processes the action response data 455*a-n* and generates potential response data 443*a-n* representing the potential response(s) (e.g., relevant potential responses, selected potential responses, ranked potential responses, etc.) for further processing (e.g., as described in detail herein). If the language model shortlister component 440 determines that there are no remaining tasks to generate potential responses for, the language model shortlister component 440 may send the potential response data 443*a-n* to the response arbitration component 460.

The potential response data 443*a-n*, in some embodiments, may be determined based on receiving potential responses from various different components that may be involved in responding to the user input data 427. For example, the potential response data 443*a-n* may include a first potential response from a first component configured to perform a first task determined by the task generation component 435, a second potential response from a second component configured to perform a second task determined by the task generation component 435, etc. The potential response data 443*a-n* can include more than one potential response relating to an individual task. In some embodiments, the potential response data 443*a-n* may include data in a natural language form.

In some embodiments, the language model shortlister component 440 may be configured to determine a request (e.g., an API call) for a retrieval system (which may be included in the responding components 650) to obtain content corresponding to the user input data 427 or the task data 437. In some embodiments, the language model shortlister component 440 may determine which retrieval system to call based on the user input data 427/the task data 437 and based on various retrieval systems being evaluated using the retrieval system evaluation component 110 as described above (e.g., based on the RC metric 155 corresponding to the retrieval system and a question/question type).

In some embodiments, the action response data 455 may include retrieved content based on a request to a retrieval system and the action response data 455 may be processed by the retrieval system evaluation component 110 as the document results 125 input. Based on a RC metric 155 corresponding to the action response data 455, the language model orchestrator 430 may perform one or more actions including, but not limited to, including the action response data 455 in the potential response data 443 thus enabling use of the retrieved content to respond to the user input data 427; using the action response data 455 to train one or more language models of the language model orchestrator 430; updating the retrieval system evaluation data storage with an association between the user input data 427/the task data 437 and the retrieval system; and/or discarding the action response data 455 thus not using the retrieved content to respond to the user input data 427. In some embodiments, the retrieval system evaluation component 110 may process the responsive output data 462 (described below) as the answer data 114 input.

In some embodiments, when the RC metrics 155 corresponding to particular retrieval systems, questions and document results satisfy a condition, then the language model shortlister component 440 may be configured (e.g., fine-tuned) using data representing the foregoing (e.g., data stored in the retrieval system evaluation data storage) to improve the language model shortlister component 440 determination of an appropriate (e.g., best or better) retrieval system for the user input data 427, thus, improving an accuracy or quality of retrieved content used by the language model orchestrator 430 to determine a response to the user input data 427.

In some embodiments, the data stored in the retrieval system evaluation data storage may be used to determine exemplar data, representing examples of API calls for particular retrieval systems, and one or more exemplars corresponding to the user input data 427 or the task data 437 may be identified and included in the prompt data 615 (shown in FIG. 6). The exemplars, corresponding to retrieval systems, may be stored in the index storage 630 shown in FIG. 6.

The response arbitration component 460 processes the potential response data 443*a-n* to determine whether the potential responses generated for the task(s) are responsive to the user input. The response arbitration component 460 processes the potential response data 443*a-n* (representing at least the generated potential responses) and selects one or more of the potential responses that are determined to be responsive to the user input and/or determines that none of the actions are responsive to the user input. For example, the response arbitration component 460 may process the potential response data 443*a-n* to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like.

In some embodiments, the response arbitration component 460 may process as described above using language model(s) (e.g., LLMs). For example, the response arbitration component 460 may include a language model (e.g., an LLM) configured to generate a response to the user input using one or more of the potential responses that are determined to be responsive to the user input and/or determines that none of the potential responses are responsive to the user input. In some such embodiments, the user input data 427 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generates the indication that none of the potential responses are responsive to the user input, the indication may further include a request for information to be output to the user (and/or provided to another component of the system configured to determine the information).

The output generated by the response arbitration component 460 may be provided to one or more components of the system 100 (e.g., the TTS component 856, a visual output component, etc. via, for example, the action plan execution component 445) and/or sent to the device 810 for output to the user.

Figure 5:
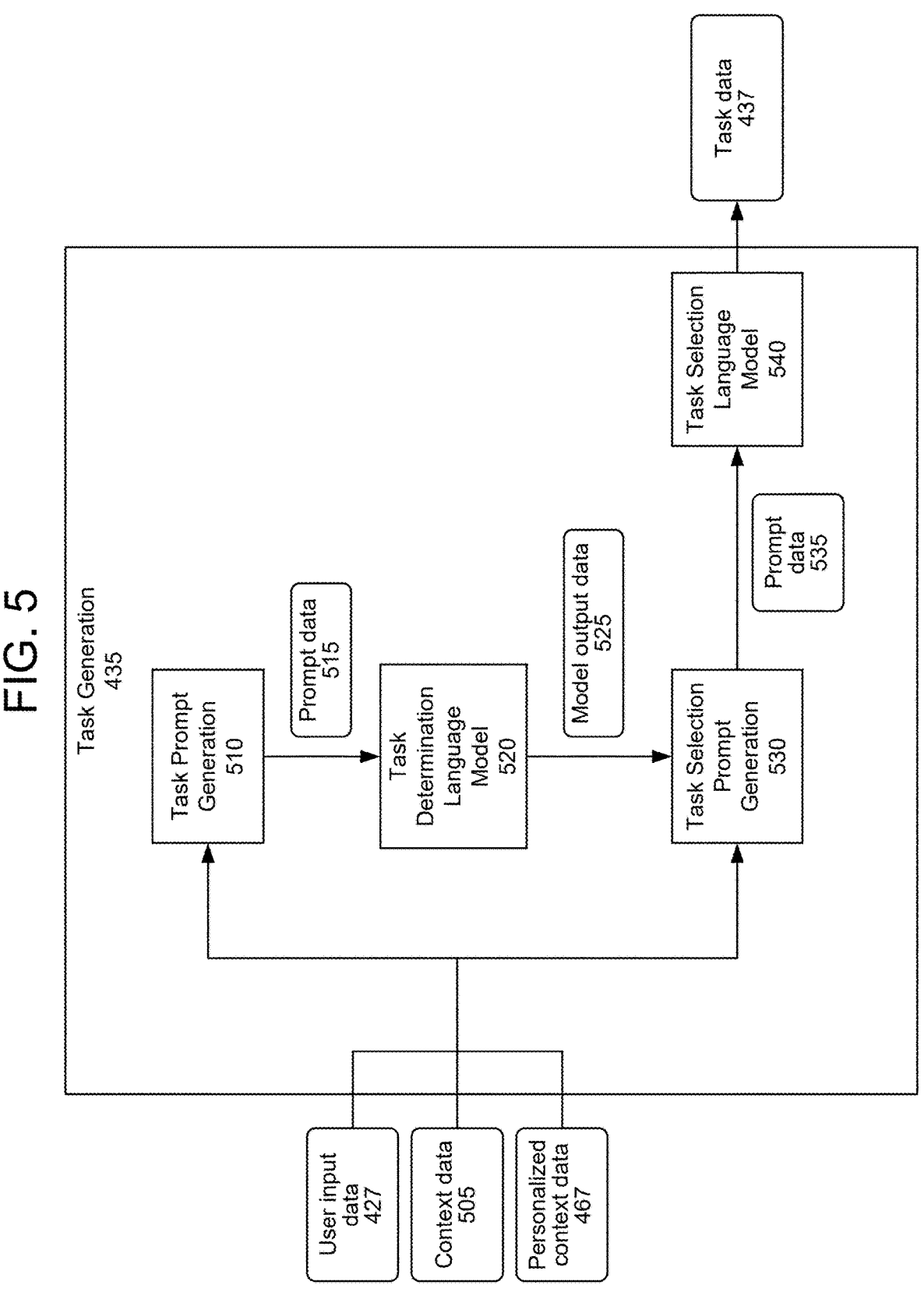
FIG. 5 is a conceptual diagram illustrating example components and processing of a task generation component of the system, according to embodiments of the present disclosure.

FIG. 5 illustrates example processing of the task generation component 435. As shown in FIG. 5, the task generation component 435 may include a task prompt generation component 510, a task determination language model 520, a task selection prompt generation component 530, and a task selection language model 540.

As further shown in FIG. 5, the user input data 427 is received at the task prompt generation component 510, which is configured to generate a list of (e.g., one or more) tasks (e.g., steps/actions) that are to be completed in order to perform an action responsive to the user input. The task prompt generation component 510 may also be configured to select a task of the list of the tasks that is to be completed first (e.g., in a current iteration of processing by the system 100).

The task prompt generation component 510 processes the user input data 427 to generate prompt data 515 representing a prompt for input to the task determination language model 520. In some embodiments, the task prompt generation component 510 may further receive an indication of a remaining task(s) to be completed with respect to the user input data 427. A task to be completed may correspond to a task for which the system 100 has yet to generate potential responses for (e.g., for which the responding component 650a-n, such as the API provider component, the language model agent component, the skill component 854, and/or the TTS component 856 have yet to generate action response data for). Similarly, a completed task may correspond to a task for which the system 100 has generated potential responses for (e.g., for which the responding component 650a-n, such as the API provider component, the language model agent component, the skill/application component 854, and/or the TTS component 856 have generated action response data). For example, if the current iteration of processing with respect to the user input data 427 is a subsequent iteration of processing (e.g., the system previously determined that more than one task is to be completed in order to perform an action responsive to the user input data 427 and has previously generated potential responses for at least a first task of the more than one tasks), then the task prompt generation component 510 may further receive an indication of the remaining tasks to be completed. In such embodiments, the task prompt generation component 510 may further receive an indication of the task(s) to complete processing for and/or the potential response(s) of the processing. The task prompt generation component 510 may further receive the context data 505 representing various contextual signals associated with the user input data 427, such as weather information, time of day, device information associated with the device that sent the user input data 427 (e.g., device ID, device states, historical device interaction data, etc.). Prompt data 515 may thus be generated based on processing of the user input data 427 and the context data 505 (and, in some embodiments, the indication of the remaining task(s), completed task(s), and/or the potential responses). In some embodiments, the prompt data 515 may be generated further based on the personalized context data 467.

The task prompt generation component 510 may receive the personalized context data 467 from the personalized context component 465. As discussed herein above, the personalized context component 465 may be configured to determine and return contextual information associated with a user input to the one or more components of the system 100.

In one example the personalized context component 465 may generate and send the personalized context data 467 to system components on its own. In another example, the personalized context component 465 may generate the personalized context data 467 in response to a specific request from another component. For example, one or more of the components of the system 100 (e.g., the task determination language model 520, the task selection language model 540, the shortlister language model 640, and/or the response arbitration component 460) may determine that an ambiguity exists in the user input (or the data determined/generated as a result of processing with respect to the user input). In such examples, the personalized context component 465 may receive the user input (e.g., the user input data 427), other data associated with the current task (e.g., one or more portions of the task data 437), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 465 may process as described herein above to generate the personalized context data 467 (e.g., "The user prefers [Music Streaming Service 1].")

In some embodiments, task prompt generation component 510 (or another component of the system 100) may process the personalized context data 467, the user input data 427, and/or the potential responses associated with the user input data 427 to generate prompt data 515 that includes a natural language representation of the user input (represented by the user input data 427) as well as a natural language representation of the contextual information of the personalized context data 467 (e.g., a contextual rewrite of the user input).

In some embodiments, the prompt data 515 may include a directive for the task determination language model 520 to determine one or more tasks (e.g., steps/actions) that are to be completed in order to perform an action responsive to the user input given the other information (e.g., the context data 505, the personalized context data 467, the indication of the remaining task(s), the indication of the completed task(s), and/or the corresponding potential responses) represented in the prompt data 515.

The task determination language model 520 processes the prompt data 515 to generate model output data 525 representing one or more predicted tasks to be completed in order to perform the action responsive to the user input. For example, based on processing the first example prompt data provided above, the task determination language model 520 may output model output data 525a: {"turn on all of the lights except the garage light,"} or the like. For further example, as discussed above, based on processing prompt data corresponding to the user input "please order some pizza for dinner" the task determination language model 520 may output model output data 525b: {"identify user pizza preference;" "find application that enables ordering of pizza," or the like. After the first task of "identify user pizza preference" is complete, and based on processing the second example prompt data provided above, the task determination language model 520 may further output model output data 525*c*: {"find an application to order pizza" "find API to order [Pizza Company Name 1] pizza,"} or the like. In some embodiments, the threshold for determining the one or more tasks may be such that the task determination language model 520 is encouraged to generate multiple predicted tasks for a given user input, where the system 100 may parse and filter the list of tasks during downstream processing (e.g., during the processing of the task selection language model 540). For example, based on processing the first example prompt data provided above, the task determination language model 520 may output model output data 525*d*: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 525 is sent to the task selection prompt generation component 530, which processes the model output data 525 to generate prompt data 535 representing a prompt for input to the task selection language model 540. In some embodiments, such prompt data 535 may be generated based on combining the user input data 427, the context data 505, the personalized context data 467, the prompt data 515, and/or the model output data 525. In some embodiments, the task generation component 435 may include another component that parses the model output data 525 to determine the one or more tasks and may send a representation of the one or more tasks to the task selection prompt generation component 530.

In some embodiments, the prompt data 535 may be a directive for the task selection language model 540 to select a task of the one or more tasks that is to be completed first (e.g., completed during the current iteration of processing) given the information (e.g., user input data 427, the context data 505, the personalized context data 467, and the one or more tasks) included in the prompt data 535. In some embodiments, the prompt data 535 may further include a directive for the task selection language model 540 to determine a priority of the one or more tasks (e.g., an ordered list representing the order in which the one or more tasks are to be completed).

The task selection language model 540 processes the prompt data 535 to generate model output data representing the task to be completed first and/or a prioritization of the one or more tasks. For example, based on processing the first example prompt data provided above, the task selection language model 540 may output model output data: {"1. Turn on all of the lights except the garage light,"} or the like. For further example, based on processing the second example prompt data provided above, the task selection language model 540 may output model output data: {"1. Find an API that sells [Pizza Company Name 1] pizza,"} or the like. In some embodiments, during processing of the task selection language model 540 to select and/or prioritize the one or more tasks, the task selection language model 540 may update the task list to remove any redundant and/or conflicting tasks. For example, for the second example prompt data, the task selection language model 540 may determine that the remaining tasks of "find an application that sells pizza" and "find an API that sells [Pizza Company Name 1] pizza" are redundant, and that "find an API that sells [Pizza Company Name 1] pizza has a higher priority.

Therefore, the task selection language model 540 may remove the task of "find an application that sells pizza" from the remaining task list. Thereafter, the task generation component 435 (or another component of the task generation component 435) may process the model output data of the task selection language model 540 to determine task data 437 representing the user input data 427, the personalized context data 467, and/or the task selected by the task selection language model 540 to be completed first. In some embodiments, the task data 437 may include the remaining one or more tasks and/or may indicate the prioritization of the one or more tasks, as determined by the task selection language model 540. The task data 437 may be sent to the language model shortlister component 440, which is described in detail herein below with respect to FIG. 6.

FIG. 6 illustrates example processing of the language model shortlister component 440. As shown in FIG. 6, the language model shortlister component 440 may include an index storage 630, an API retrieval component 620, a shortlister prompt generation component 610, and a shortlister language model 640.

The language model shortlister component 440 is configured to determine one or more components, for example, responding components 650*a-n* to perform an action related to the user input or the current task. Responding component(s) 650*a-n* may be APIs, skill/application component(s) 854, language model agent component(s), TTS component 856, etc. In some embodiments, the responding components 650*a-n* may be plugins that can be used with a language model described herein (e.g., the shortlister language model 640, the task selection language model 540, etc.), where the plugin may add functionality and features to the language model capabilities.

In some embodiments, the language model shortlister component 440 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 6, the task data 437 is received at the shortlister prompt generation component 610. The shortlister prompt generation component 610 processes the task data 437 to generate prompt data 615 representing a prompt for input to the shortlister language model 640. In some embodiments, such prompt data 615 may be generated based on combining the task data 437 (e.g., the user input data 427, the context data 505, the selected task, remaining tasks, potential responses associated with one or more previous tasks, etc.) and relevant API data 635 representing one or more APIs associated with the user input data 427 and/or the current task.

The relevant API data 635 may be generated by the API retrieval component 620, which may be configured to retrieve one or more (e.g., top-k) relevant APIs associated with the user input data 427 or the current task. In some embodiments, the APIs may correspond to various components. For example, the components may correspond to rule-based components, ML-based components, language model-based components, or the like, such as the personalized context component 465, the orchestrator component

830, the responding component 650*a-n*, etc.) In some embodiments, the APIs may correspond to the components.

The API retrieval component 620 may use retrieval-based approaches to retrieve the one or more relevant APIs from the index storage 630, which may store various information associated with multiple APIs (and/or components) such as component descriptions, API arguments (e.g., parameter inputs/outputs), identifiers for components (e.g., such as personalized context component 465, the responding component 650*a-n*, etc.) that provides the API, etc. For example, the API retrieval component 620 may compare one or more APIs (and/or components) included in the index storage 630 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 620 (or another component of the API retrieval component 620) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 635. In some embodiments, the API retrieval component 620 may determine the relevant API data 635 further using contextual information, including the personalized context data 467, an accuracy/defect rate value associated with the APIs (and/or components), and/or a historical latency value associated with the APIs (and/or components) (e.g., which may be included in the description of the API). In some embodiments, the index storage 630 may be included in the API retrieval component 620 or may otherwise be included in system component(s) 820. Similar processing may be performed to determine one or more components that are semantically similar to the user input or the current task, which may be included in the relevant API data 635. The API retrieval may send the relevant API data 635 to the shortlister prompt generation component 610.

In some embodiments, the prompt data 615 may include a directive for the shortlister language model 640 to determine one or more APIs (and/or components) that are to process with respect to the user input or the current task (e.g., determine one or more API calls to cause the APIs (and/or components) to process) given the information (e.g., the user input data 427, the personalized context data 467, the current task, and the relevant API data 635).

The shortlister language model 640 processes the prompt data 615 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 640 may generate API calls for a subset of the APIs represented in the prompt data 615. For example, based on processing the first example prompt data provided above, the shortlister language model 640 may output model output data: {"Use Let's chat API to turn on all of the lights except the garage light, Use Smart Home skill to turn on all of the lights except the garage light"}, {"Lets_chat.query("turn on all of the lights except the garage light"), Smart_Home.turn_on_device("[device names]"),} or the like. For further example, based on processing the second example prompt data provided above, the shortlister language model 640 may output model output data: {"Use [Food Ordering Application 1] to order pizza, Use [Food Ordering Application 2] to order pizza"}, {[Food Ordering Application 1].order("Brooklyn style pizza"), [Food Ordering Application 2].order("Brooklyn style pizza"),} or the like The shortlister language model 640 may generate the one or more APIs calls (including the required input parameters) by applying in-context learning for cold-starting API calls (e.g., one-shot/few-shot learning). For example, in embodiments where the relevant API data 635 includes the component descriptions, the shortlister language model 640 may use the one or more exemplars included in the component descriptions (included in the prompt data 615) to determine the one or more input parameters for the API call. In some embodiments, the shortlister language model 640 may be finetuned on such exemplars (e.g., during offline or runtime processing), such that the shortlister language model 640 is capable of determining the one or more input parameters for the given API call.

During processing of the shortlister language model 640 and after generating the one or more requests, the shortlister language model 640 may cause the one or more requests to be executed. For example, as shown in FIG. 6, the shortlister language model 640 may send action plan data 442 representing the one or more requests to the action plan execution component 445, which causes execution of the one or more requests included in the action plan data 442. For example, the action plan execution component 445 may process the action plan data 442 to generate action data 647*a-n*. Action data 647*a* may represent, for example, a directive (e.g., an executable API call determined from/generated based on the action plan data 442) for a particular API to process with respect to the user input and/or the current task. In embodiments where the action plan data 442 includes requests corresponding to incomplete API calls, API call formats, indications of actions to be performed by one or more components, the action plan execution component 445 may be configured to generate executable API calls corresponding to the action plan data 442. In some embodiments, the action plan execution component 445 may generate the action data 647*a-n* to represent a directive to provide the responses including the potential response(s)/potential action(s) with respect to the user input and/or the current task.

In some embodiments, the shortlister language model 640 may send model output data including the one or more requests to another component of the language model orchestrator component 430, which may be configured to parse the model output data to identify the one or more requests. Thereafter, the component may generate the action plan data 442 representing the one or more requests and send the action plan data 442 to the action plan execution component 445.

The action plan execution component 445 may send the action data 647*a*-*n* to the responding component 650*a*-*n*, such as the API provider component, the language model agent component, the skill component 854, and/or the TTS component 856. The API provider component may include one or more components (e.g., rule-based components, ML-based components, language model-based components, or the like) that may be caused to process using the action data 647*a*-*n* (e.g., using the API calls generated by the language model shortlister component 440).

The TTS component 856 may be configured to process textual or tokenized input to generate audio data representing synthesized speech corresponding to the textual or tokenized input spoken by a synthetic voice. The processing of the TTS component 856 is discussed in detail below with respect to FIG. 8.

The skill/application component 854 may be software running on the system component(s) 820 that is akin to a software application. That is, a skill component 854 may enable the system component(s) 820 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 820 may be configured with more than one skill component 854. For example, a weather service skill component may enable the system component(s) 820 to provide weather information, a car service skill component may enable the system component (s) 820 to book a trip with respect to a taxi or ride sharing service, a restaurant skill component may enable the system component(s) 820 to order a pizza with respect to the restaurant's online ordering system, etc. A skill component 854 may operate in conjunction between the system component(s) 820 and other devices, such as the user device 810, in order to complete certain functions. A skill component 854 may include hardware, software, firmware, or the like that may be dedicated to a particular skill component 854 or shared among different skill components 854.

The language model agent component may correspond to one or more language mode (e.g., LLM) agents. A language model agent component may correspond to a custom instantiation of a language model (e.g., an LLM (and other components)) that is configured to handle user inputs relating to a particular domain/functionality. The language model agent component may also be configured to process user inputs in the manner of a particular virtual assistant "personality" such as a particular AI agent, celebrity, fictional character, or the like with corresponding functionality (e.g., input processing, NLG, TTS, etc.) that goes with the corresponding personality. In some embodiments, the language model agent component may be configured to handle specific use cases via particular prompt generation, fine-tuning of the language model, etc. For example, the language model agent component may be configured to handle user inputs/ tasks related to information query, the language model agent component may be configured handle user inputs/tasks related to shopping, the language model agent component may be configured to handle user inputs/tasks related to ordering food from various restaurants, the language model agent component may be configured to handle user inputs/ tasks related to ordering food from a particular restaurant (e.g., a particular pizza restaurant), the language model agent component may be configured to handle user inputs/ tasks related to booking a hotel, the language model agent component may be configured to handle user inputs/tasks related to booking a flight, etc.

The API provider component may include various components that may be caused to execute using the action data 647*a*-*n*. For example, the API provider component may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 647*a*-*n* may include an indication(s) (e.g., slots) of one or more entities included in the user input, as determined by one or more of the language models 520, 540, 640, in which case the ER component may process to link the one or more entities to the specific, referenced, entity known to the system 100.

In other embodiments, the ER component may be configured to process the action data 647*a*-*n* to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component may include a search component, which may be configured to query a storage (e.g., a database, repository, knowledge base, etc.) for information usable for generating a response to a user input. For example, if the action data 647*a*-*n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component may include the device controller component discussed herein above, which may be further configured to cause a device to perform an action corresponding to the action data 647*a*-*n*.

In some embodiments, the API provider component may include a domain service component, which may be configured for interacting with one or more services defined by particular users, such as developers, specialists, or the like (e.g., to receive information, such as responses or annotations, to cause an action.

One or more of the responding components 650a-n may send action response data 455a-n representing one or more potential responses generated by the one or more APIs corresponding to the action data 647a-n (e.g., the potential response(s) and/or potential action(s)) to the action plan execution component 445. For example, in response to an API call to the skill component 854 associated with a user input for turning on a light, the action response data 455a may correspond to a potential action of "turn on the light," "turn_on_device ("light", [device ID])", or the like. For further example, in response to an API call to the skill component 854 associated with a user input for ordering a pizza from a particular restaurant, the action response data 455b may correspond to a potential action of "order medium pizza from [restaurant name]", "order_pizza ("medium", "pizza", "[restaurant name]")", or the like. The action plan execution component 445 may send the action response data 455a-n to the shortlister language model 640.

In some embodiments, the action plan execution component 445 may send the action response data 455a-n to the shortlister prompt generation component 610, which may generate further prompt data including the action response data 455a-n and be sent to the shortlister language model 640. For example, the further prompt data may be generated based on combining the prompt data 615 and the action response data 455a-n.

In some embodiments, the shortlister language model 640 may process the action response data 455a-n (or the further prompt data including action response data 455a-n) to generate a natural language summary of the action response data (e.g., the potential response data 443a-n). In some embodiments, the potential response data 443a-n may include an association between action response data 455a (or a summarized representation of the action response data 455a) and an indication of the API/component that generated the action response data 455a (e.g., a component identifier, component description, etc.). In some embodiments, the shortlister language model 640 may be configured to filter and/or rank the action response data 455a-n based on how relevant the action response data 455a-n is to the current task. In some embodiments, the shortlister language model 640 may be configured to filter and/or rank the action response data 455a-n based on a confidence level of the component that provided the action response data, where the confidence level may indicate a likelihood of the component being able to respond (e.g., within a period of time), the component being able to perform a potential action that corresponds to the current task, etc. In some embodiments, the action response data 455a-n may indicate whether or not the corresponding component is able to respond (e.g., the action response data 455a may include a Boolean value such as "yes" or "no" or other similar indications). In some embodiments, the shortlister language model 640 may filter and/or rank the action response data 455a-n based on information included in the prompt data 615 (e.g., the user input data 427, the relevant API data 635, the context data 505 the personalized context data 467, the prompt data 515, etc.). For example, the potential response data 443a-n may include a subset of the action response data 455a-n (or the summarized representations of the action response data 455a-n) and may further include a representation of a confidence associated with the action response data 455a (or a summarized representation of the action response data 455a). As such, the potential response data 443a-n may further include data representing a confidence of how relevant the action response data 455a is to the current task. In some embodiments, the shortlister language model 640 may consider a rating associated with the component that provided the action response data 455a, where the rating may be a user satisfaction rating provided by multiple different users of the system 100, a user satisfaction rating provided by the user 405 associated with the user input data 427, a system generated rating based on the number of past tasks handled by the component, a accuracy rating based on the number of past tasks the component had handled correctly/provided a desired response for, etc.

The language model shortlister component 440 may send the potential response data 443a-n for further processing. In instances where the task generation component 435 determined that more than one task is to be completed, the language model shortlister component 440 may send the potential response data 443a-n to the task generation component 435, which may process as described herein above to maintain and prioritize the task list based on the potential response data 443a-n and select a new task to be completed. In instances where the task generation component 435 determined that only one task is to be completed, or in instances where the language model shortlister component 440 determines that there are no remaining tasks to be completed, the language model shortlister component 440 may send the potential response data 443a-n, and the potential responses associated with previously completed tasks (e.g., previous action response data) to the response arbitration component 460 to process as discussed herein above. The language model shortlister component 440 may further send the user input data 427, the context data 505, the personalized context data 467, etc., to the task generation component 435 and/or the response arbitration component 460.

In some embodiments, the language model orchestrator component 430 may further include a memory storage (not illustrated) which may store various information associated with the processing performed (e.g., user input data 427, the prompt data 515, the context data 505, the personalized context data 467, the model output data 525, prompt data 535, the task data 437, the relevant API data 635, the prompt data 615, the action plan data 442, the action response data 455a-n, the potential response data 443a-n, etc.) during one or more previous iterations of processing by the language model orchestrator component 430 for the user input data 427. As such, after the language model shortlister component 440 generates the potential response data 443a-n, the language model orchestrator component 430 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 510 may receive one or more portions of the data included in the memory storage (which were generated during one or more previous iterations of processing performed with respect to the user input data 427) and include the one or more portions of data in the prompt data 515.

As discussed herein above, the shortlister language model 640 may be configured to determine whether additional information is needed in order to complete the current task (e.g., if an ambiguity exists in the user input data 427 or the current task, if the current task is to resolve an identified ambiguity, if an API argument is missing from the user input or other available data, etc.), in which case the shortlister language model 640 may send data representing a request for such additional information to the response arbitration component 460. In some embodiments, the action plan data 442 may represent the request for additional information, and the action plan execution component 445 may be configured to send corresponding action data 647*a-n* to the personalized context component 465. For example, for the example provided herein above with respect to ordering pizza, the shortlister language model 640 may determine that in order to resolve an ambiguity with respect to the user input data 427 or current task (e.g., based on the current task being to resolve the ambiguity or a determination that the current task cannot be completed due to the ambiguity), the system 100 must "identify user pizza preference," or the like. The system 100 may send a request to the personalized context component 465 to "identify user pizza preference" and the personalized context component 465 may process as described herein above to return personalized context data resolving the ambiguity (e.g., the user's pizza preference may be determined to be a cheese pizza or a pepperoni pizza).

Figure 7:
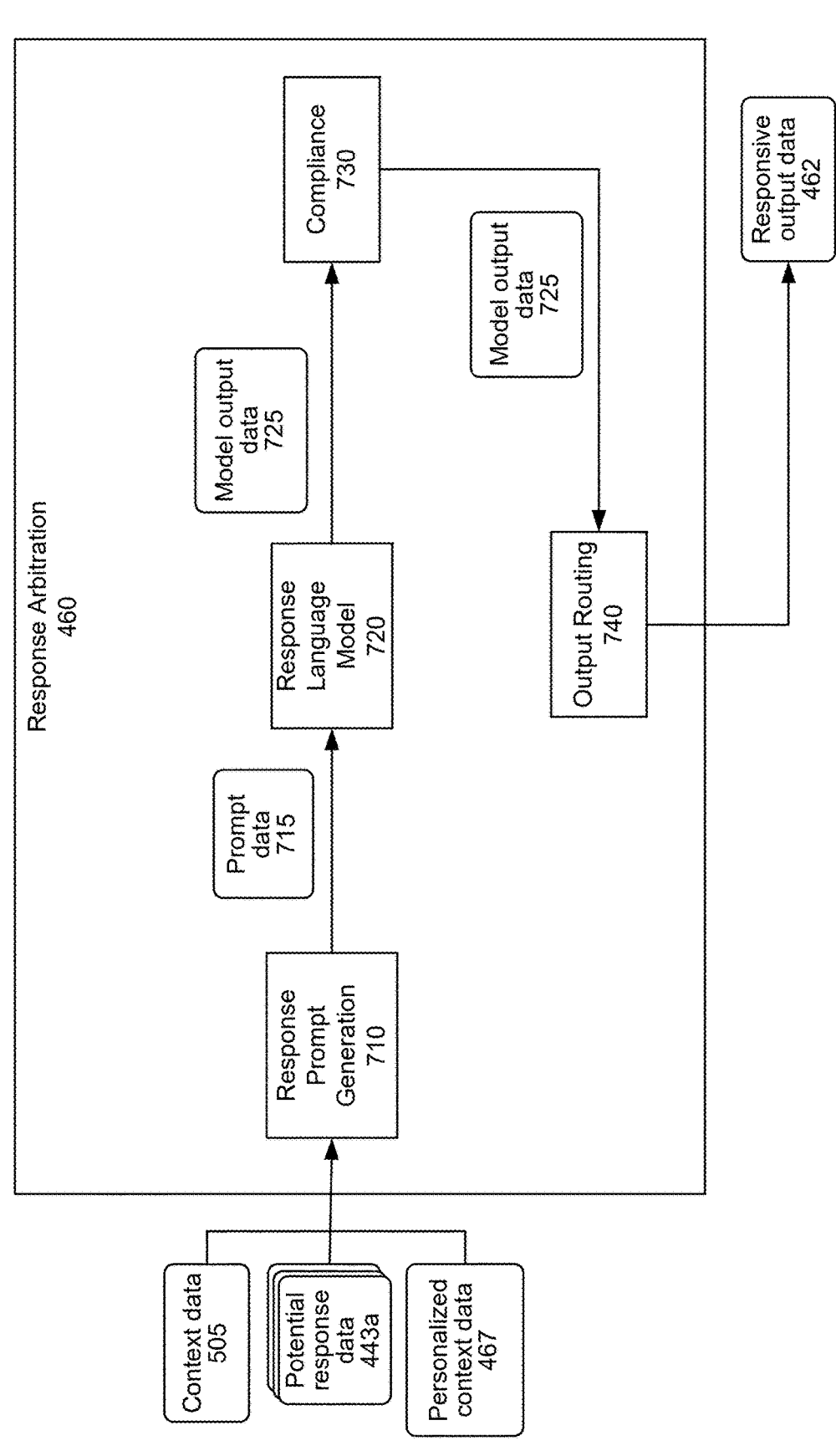
FIG. 7 is a conceptual diagram illustrating example components and processing of a response arbitration component of the system, according to embodiments of the present disclosure.

FIG. 7 illustrates example components and processing of the response arbitration component 460. As shown in FIG. 7, the response arbitration component 460 may include a response prompt generation component 710, a response language model 720, a compliance component 730, and an output routing component 740. As discussed herein above, the response arbitration component 460 processes the potential response data 443*a-n* (representing the potential responses generated by the one or more components determined to be associated with the user input) to determine whether one or more of the potential responses generated by the system 100 are responsive to the user input. The response arbitration component 460 may then generate the natural language response to the user input.

As shown in FIG. 7, the response arbitration component 460 receives the potential response data 443*a-n* (output by the language model shortlister component 440) at the response prompt generation component 710. The response prompt generation component 710 may further receive the user input data 427, the personalized context data 467 (from the language model shortlister component 440 or the personalized context component 465) and the context data 505.

The personalized context data 467 may represent one or more contextual signals associated with the user 405, such as information associated with a user profile of the user 405 (e.g., user ID, user behavioral information, user preferences, age, gender, historical user interaction data, devices associated with the user profile, etc.), which may be determined using, for example, a user recognition component 895. In some embodiments, an indication of the user 405 and/or user profile may be included in the user input data 427 (e.g., as included in the output of the ASR component 850). In some embodiments, the personalized context data 467 may include dialog history data representing one or more user inputs and corresponding system-generated responses for a current interaction between the user 405 and the system 100.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to multiple related user inputs and system 100 outputs (e.g., through user device(s) 810) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 710 may process the potential response data 443*a-n*, the user input data 427, context data 505, and the personalized context data 467 (and, optionally, the further information received from the language model shortlister component 440) to generate prompt data 715 representing a prompt for input to the response language model 720. In some embodiments, the prompt data 715 may be a directive for the response language model 720 to determine whether one or more of the potential responses represented in the potential response data 443*a-n* are responsive to the user input given the other information (e.g., the personalized context data 467, the context data 505, the potential responses associated with the previous tasks (e.g., previous action response data) associated with the user input, and the user input data 427) included in the prompt data 715. The prompt data may further be a directive for the response language model 720 to, if the response language model 720 determines that one or more of the potential responses are responsive to the user input, cause performance of the one or more corresponding actions (e.g., the one or more potential actions included in the selected responses) and/or cause the system 100 to inform the user 405 of the one or more selected responses. For example, in some embodiments, prompt data 715 may further direct the response language model 720 to generate a natural language summary of the one or more selected responses determined to be responsive to the user input. The prompt data 715 may direct the response language model 720 to cause the system 100 to output the natural language summary to the user 405.

In some embodiments, the prompt data 715 may further include a directive for the response language model 720 to, if the response language model 720 determines that none of the potential responses are responsive to the user input, generate a request for additional information from a component of the system 100 and/or the user 405. As discussed above, the additional information may be any information usable to determine and/or perform an action responsive to the user input (e.g., to resolve an ambiguity associated with the user input and/or a task(s) associated with the user input).

In some embodiments, the response prompt generation component 710 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data 715 may include "Please generate a polite, respectful, and safe response and one that does not violate protected class policy."

The response language model 720 processes the prompt data 715 to generate the model output data 725 representing the one or more selected responses determined to be responsive to the user input, the natural language summary of the one or more selected responses, and/or the request for additional information.

If the response language model 720 determines that one or more of the potential responses are responsive to the user input, the response language model 720 may generate the model output data 725 to represent the one or more selected responses or a natural language summary of the one or more selected responses to be output to the user. For example, based on processing the first example prompt data above, the response language model 720 may select one of the potential responses (e.g., the potential responses from skill component A (e.g., a weather skill component)) determined to be responsive to the user input to generate model output data 725a: {"It is currently 70 degrees, with a high of 75 and a low of 68,"} or the like. For further example, based on processing the first example prompt data provided above, the response language model 720 may select more than one of the potential responses (e.g., the potential responses from both the skill component A and skill component B) determined to be responsive to the user input and generate a summary of the selected responses to generate model output data 725b: {"It is expected to be mostly sunny today, with a high of 75 and a low of 68, but with a chance of rain in the late afternoon,"} or the like.

As another example, based on processing the second example prompt data provided above, the response language model 720 may select one of the potential responses (e.g., the potential response from Component A (e.g., the personalized context component 465) representing that the user ordered Brooklyn style pizza from [Pizza Company 1 Name]) determined to be responsive to the user input to generate model output data 725c: {"Ok, I will place an order for Brooklyn style pizza from [Pizza Company 1 Name],"} or the like. As a further example, based on processing the second example prompt data provided above, the response language model 720 may select more than one of the potential responses (e.g., the potential responses from both component A and API A) determined to be responsive to the user input and generate a summary of the selected responses to generate the model output data 725d: {"Ok, I will place an order for Brooklyn style pizza from [Pizza Company 1 Name] using [Food Ordering Application 1] API,"} or the like.

As such, the response language model 720 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 720 may cause output of the selected responses (e.g., the subset of potential responses) or a natural language summary of the selected responses to the user.

In some embodiments, the response arbitration component 460 may also generate and send a directive to the components, (e.g., API(s), components, agents, etc.) configured to perform the potential actions included in the selected responses to cause performance of the potential actions (or another component of the system 100 configured to cause the components to perform the potential actions, such as the action plan execution component 445, which is discussed in more detail herein below). For example, in instances where the selected responses include a potential action to be performed, the response language model 720 may further cause the corresponding components to perform the potential action (e.g., cause [Food Ordering Application 1] API to order the Brooklyn style pizza from [Pizza Company 1 Name] using [Food Ordering Application 1]). In other embodiments, the system 100 may not generate and/or send the directive until approval to perform the action(s) is received from the user 405.

If the response language model 720 determines that none of the potential responses are responsive to the user input and/or that an ambiguity exists with respect to the user input and/or one or more of the determined tasks, the response language model 720 may generate the model output data 725 to represent a request to be output to the user and/or the personalized context component 465. For example, based on processing the first example prompt data provided above, the response language model 720 may determine an ambiguity exists with respect to the size of the pizza to be ordered and may generate the model output data 725e: {"What size pizza should I order?",} {"What size pizza does the user usually order?",} or the like to be output to the user and/or sent to the personalized context component 465.

The response language model 720 may send the model output data 725 to the compliance component 730, which is configured to determine whether model output data generated by the response language model 720 is appropriate for output to the user 405. In other words, the compliance component 730 processes the model output data 725 to determine whether the model output data 725 includes any inappropriate/sensitive information that should not be output to the user 405 (e.g., confidential information, offensive language, etc.). In some embodiments, the compliance component 730 may be configured to compare the model output data 725 to one or more words determined to be inappropriate/sensitive and should not be output to the user 405. In some embodiments, the compliance component 730 may include/implement an ML model. For example, the ML model may process the model output data 725 to determine whether the model output data 725 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 730 indicates that the model output data 725 includes information that is not appropriate for output to the user 405, the compliance component 730 may cause further processing of the model output data 725 by downstream components to halt. In some embodiments, the response arbitration component 460 may cause the response language model 720 to generate new responsive output data to be evaluated by the compliance component 730. For example, the response arbitration component 460 may cause the response prompt generation component 710 to generate new prompt data, which may include the prompt data 715, the model output data 725, and an indication that the model output data 725 is not appropriate for output to the user 405. The new prompt data may be a directive to generate new model output data that is appropriate for output to the user 405.

If the output of the compliance component 730 indicates that the model output data 725 are appropriate for output to the user, the compliance component 730 may send the model output data 725 to the output routing component 740. The output routing component 740 processes the model output data 725 to determine one or more components that are to be caused to process in response to the model output data 725. In other words, the output routing component 740 parses the model output data 725 to determine one or more components that the responsive output data 462 is to be routed to (or that are to be caused to process based on the responsive output data 462).

For example, in an instance where the response language model 720 determines that one or more of the potential responses are responsive to the user input and generates the responsive output data 462 including the one or more selected responses (or a natural language summary of the one or more selected responses)/the request for additional information, the output routing component 740 may parse the model output data 725 to determine the selected responses/the natural language summary and send the responsive output data 462 to a component configured to generate corresponding data to be output to the user 405. For example, the output routing component 740 may send the responsive output data 462 to the TTS component 856, which may process as described herein above to generate output audio data including synthesized speech corresponding to the responsive output data 462, which the system 100 may send to the user device 810 for output to the user 405. In some embodiments, the system 100 may further include a component configured to generate visual output data (e.g., output image and/or video data) corresponding to the responsive output data 462, which may be sent to the user device 810 to be output to the user.

For further example, in embodiments where the model output data 725 includes selected responses that include one or more potential actions to be performed, the output routing component 740 may process as described herein above to determine the one or more selected responses/the natural language summary and send the responsive output data 462 to the one or more components associated with the selected responses. In such embodiments, the responsive output data 462 may further include a directive for the one or more components to perform the potential actions corresponding to the selected responses. For example, in some embodiments, the components corresponding to the potential responses included in the potential response data 443*a-n* may, after generating the potential responses, suspend processing required to perform the potential action included in the potential responses and await a directive from the system 100 to perform the potential action. As such, the output routing component 740 may include the directive in the responsive output data 462 to cause the component to perform the potential action. In some embodiments, the output routing component 740 may generate an API call configured to cause the component to perform the action.

In some embodiments, where the model output data 725 includes selected responses that include one or more potential actions to be performed, the responsive output data 462 may further request authorization from the user 405 to perform the one or more potential actions responsive to the user input. After receiving the request authorization (e.g., via a subsequent user input) the response arbitration component 460 may generate and send the corresponding directive (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 460 may use such data as authorization to perform the one or more potential actions. For example, the user 405 may have previously provided authorization for a set of actions (e.g., turning on outside lights). Thereafter, the system 100 may determine the one or more potential actions to be performed in response to the user input data 427. If the system 100 determines that the one or more actions are included in the set of actions previously authorized by the user 405, the system 100 may not ask for further authorization prior to causing the one or more potential actions to be performed.

For further example, in an instance where the response language model 720 generates the model output data 725 including a request for additional information (in response to the response language model 720 determining that none of the potential responses are responsive to the user input and/or an ambiguity exists with respect to the user input and/or one or more of the tasks), which may be determined by the output routing component 740 based on, for example, the model output data 725 including a question, the output routing component 740 may parse the model output data 725 to determine whether the request for additional information is to be sent to the personalized context component 465 and/or output to the user 405. In some embodiments, the response language model 720 may include in the responsive output data 462 an indication of whether the request for additional information should be sent to the personalized context component 465 and/or output to the user 405. In some embodiments, unless otherwise indicated in the model output data 725, the output routing component 740 may determine to send the request for additional information to the personalized context component 465 prior to outputting the request for additional information to the user 405. In the instance where the personalized context component 465 is unable to resolve the ambiguity (or a component of the system 100 is unable to resolve the ambiguity using the personalized context data generated by the personalized context component 465), the output routing component 740 may determine the request for additional information is to be output to the user 405.

In some embodiments, the response arbitration component 460 may be configured to further process data representing a potential response to the user input that is generated by one or more other components of the system 100 not included in the language model orchestrator component 430. For example, the response arbitration component 460 may further receive data from an orchestrator component 830 (discussed in detail herein below with respect to FIG. 8) representing a potential response to the user input (e.g., the output of the skill component 854), where the orchestration of the processing performed to generate the potential response was performed by the orchestrator component 830, rather than the language model orchestrator component 430. In such embodiments, the response arbitration component 460 may be further configured to arbitrate between first potential responses received as a result of the processing of the language model orchestrator component 430 and second potential responses received as a result of the processing of the orchestrator component 830. As discussed above, the response arbitration component 460 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 830 may be included in the potential response data 443*a-n*. For example, the orchestrator component 830 may be determined to be configured to perform a function (e.g., cause another component(s) to perform a function) potentially relevant to the user input such that the language model shortlister component 440 may cause the orchestrator component 830 to generate potential responses potentially responsive to the user input, which may be included in the potential response data 443*a-n* sent to the response arbitration component 460.

In some embodiments, the language models 520, 540, 640, 720 may be fine-tuned to perform a particular task(s). Fine-tuning of the language models 520, 540, 640, 720 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the task determination language model 520, the task selection language model 540, and/or the shortlister language model 640 indicates that additional information is needed to complete a first task associated with a user input, a request for the additional information may be sent to the personalized context component 465. Thereafter, the task determination language model 520, the task selection language model 540, and/or the shortlister language model 640 may continue to process to complete their configured operations. For example, while the personalized context component 465 is processing to determine the additional information, the system 100 may begin processing with respect to a second task associated with the user input. Thereafter, the output of the personalized context component 465 may be sent to the response arbitration component 460 such that once the response arbitration component 460 receives the output of the language model shortlister component 440, the response arbitration component 460 may resolve the ambiguity that resulted in the request for additional information in order to generate the responsive output data 462. For further example, if the user input data 427 is generated to include the natural language representation of the user input, but the processing required to determine the corresponding contextual signals (e.g., weather data, time of data, dialog history, device information, etc.) is yet to be completed, the task generation component 435 may begin processing with respect to the natural language representation of the user input. Once the corresponding contextual signals have been generated, the task generation component 435 may begin processing with respect to the contextual signals and may update downstream components with the result of the processing with respect to the contextual signals.

As another example, if the task generation component 435 determines that more than one task is to be completed to perform an action responsive to a user input, and the language model shortlister component 440 processes as described herein above to cause one or more components to generate potential responses with respect to a first task of the more than one tasks, the language model shortlister component 440 may send the potential responses (and a representation of the user input and the current task) to the response arbitration component 460 to process as described herein above with respect to those potential responses while the system 100 (e.g., the task generation component 435 and/or the language model shortlister component 440) completes processing with respect to the remaining tasks of the one or more tasks. Therefore, the response arbitration component 460 may process as described herein to select between the potential responses associated with the first task while the potential responses associated with one or more of the remaining tasks is completed. As such, the response arbitration component 460 may only need to arbitrate between the potential responses associated with the first task that were previously selected by the response arbitration component 460 as being responsive to the first task when the response arbitration component 460 later processes with respect to further potential responses associated with further tasks.

As a further example, if the API retrieval component 620 determines (e.g., with a confidence value that meets or exceeds a particular threshold) that a particular API or component description should be included in the relevant API data, the API retrieval component 620 may provide the corresponding relevant API data to the shortlister prompt generation component 610 so that the shortlister prompt generation component 610 may begin processing with respect to the relevant API data while the API retrieval component 620 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 8:
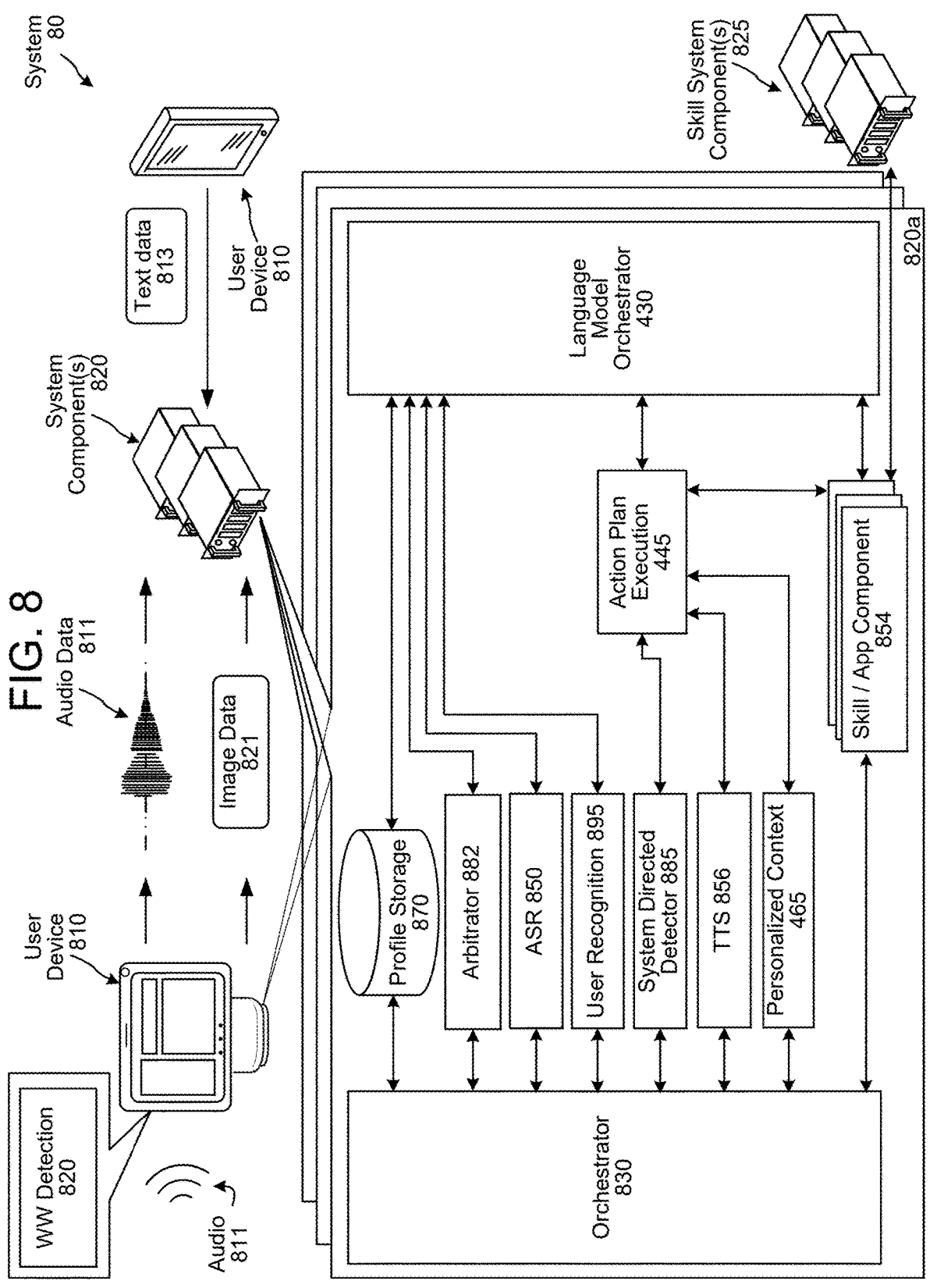
FIG. 8 is a conceptual diagram illustrating components of the system, according to embodiments of the present disclosure.

The system 100 may operate using various components as described in FIG. 8. The various components may be located on same or different physical devices. Communication between various components may occur directly or across a network(s) 199. The user device 810 may include audio capture component(s), such as a microphone or array of microphones of a user device 810, captures audio 810 and creates corresponding audio data. Once speech is detected in audio data representing the audio 810, the user device 810 may determine if the speech is directed at the user device 810/system component(s). In at least some embodiments, such determination may be made using a wakeword detection component 820. The wakeword detection component 820 may be configured to detect various wakewords. In at least some examples, each wakeword may correspond to a name of a different digital assistant. An example wakeword/ digital assistant name is "Alexa." In another example, input to the system may be in form of text data 813, for example as a result of a user typing an input into a user interface of user device 810. Other input forms may include indication that the user has pressed a physical or virtual button on user device 810, the user has made a gesture, etc. The user device 810 may also capture images using camera(s) of the user device 810 and may send image data 821 representing those image(s) to the system component(s). The image data 821 may include raw image data or image data processed by the user device 810 before sending to the system component(s). The image data 821 may be used in various manners by different components of the system to perform operations such as determining whether a user is directing an utterance to the system, interpreting a user command, responding to a user command, etc.

The wakeword detection component 820 of the user device 810 may process the audio data, representing the audio 810, to determine whether speech is represented therein. The user device 810 may use various techniques to determine whether the audio data includes speech. In some examples, the user device 810 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 810 may implement a classifier configured to distinguish speech from background noise. The classifier may be implemented by techniques such as linear classifiers, support vector machines, and decision trees. In still other examples, the user device 810 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 810, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the user device 810 may "wake" and begin transmitting audio data 811, representing the audio 810, to the system component(s) 820. The audio data 811 may include data corresponding to the wakeword; in other embodiments, the portion of the audio corresponding to the wakeword is removed by the user device 810 prior to sending the audio data 811 to the system component(s) 820. In the case of touch input detection or gesture based input detection, the audio data may not include a wakeword.

In some implementations, the system 100 may include more than one system component(s). The system component(s) 820 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 820 may result in sending audio data to system component(s) 820a for processing while detection of the wakeword "Computer" by the wakeword detector may result in sending audio data to system component(s) 820b for processing. The system may have a separate wakeword and system for different skills/systems (e.g., "Dungeon Master" for a game play skill/system component(s) 820c) and/or such skills/systems may be coordinated by one or more skill component(s) 854 of one or more system component(s) 820.

The user device 810/system component(s) 820 may also include a system directed input detector 885. The system directed input detector 885 may be configured to determine whether an input to the system (for example speech, a gesture, etc.) is directed to the system or not directed to the system (for example directed to another user, etc.). The system directed input detector 885 may work in conjunction with the wakeword detection component 820. If the system directed input detector 885 determines an input is directed to the system, the user device 810 may "wake" and begin sending captured data for further processing. If data is being processed the user device 810 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 885 determines an input is not directed to the system (such as a speech or gesture directed to another user) the user device 810 may discard the data and take no further action for processing purposes. In this way the system 100 may prevent processing of data not directed to the system, thus protecting user privacy. As an indicator to the user, however, the system may output an audio, visual, or other indicator when the system directed input detector 885 is determining whether an input is potentially device directed. For example, the system may output an orange indicator while considering an input, and may output a green indicator if a system directed input is detected. Other such configurations are possible.

Upon receipt by the system component(s) 820, the audio data 811 may be sent to an orchestrator component 830 and/or the language model orchestrator component 430. The orchestrator component 830 may include memory and logic that enables the orchestrator component 830 to transmit various pieces and forms of data to various components of the system, as well as perform other operations as described herein. In some embodiments, the orchestrator component 830 may optionally be included in the system component(s) 820. In embodiments where the orchestrator component 830 is not included in the system component(s) 820, the audio data 811 may be sent directly to the language model orchestrator component 430. Further, in such embodiments, each of the components of the system component(s) 820 may be configured to interact with the language model orchestrator component 430, the action plan execution component 445, the API provider component, and/or other component(s).

In some embodiments, the system component(s) 820 may include an arbitrator component 882, which may be configured to determine whether the orchestrator component 830 and/or the language model orchestrator component 430 are to process with respect to user input data. In some embodiments, the language model orchestrator component 430 may be selected to process with respect to the audio data 811 only if the user 405 associated with the audio data 811 (or the user device 810 that captured the audio 810) has previously indicated that the language model orchestrator component 430 may be selected to process with respect to user inputs received from the user 405.

In some embodiments, the arbitrator component 882 may determine the orchestrator component 830 and/or the language model orchestrator component 430 are to process with respect to the audio data 811 based on metadata associated with the audio data 811. For example, the arbitrator component 882 may be a classifier configured to process a natural language representation of the audio data 811 (e.g., output by the ASR component 850) and classify the corresponding user input as to be processed by the orchestrator component 830 and/or the language model orchestrator component 430. For further example, the arbitrator component 882 may determine whether the device from which the audio data 811 is received is associated with an indicator representing the audio data 811 is to be processed by the orchestrator component 830 and/or the language model orchestrator component 430. As an even further example, the arbitrator component 882 may determine whether the user (e.g., determined using data output from the user recognition component 895) from which the audio data 811 is received is associated with a user profile including an indicator representing the audio data 811 is to be processed by the orchestrator component 830 and/or the language model orchestrator component 430. As another example, the arbitrator component 882 may determine whether the audio data 811 (or the output of the ASR component 850) corresponds to a request representing that the audio data 811 is to be processed by the orchestrator component 830 and/or the language model orchestrator component 430 (e.g., a request including "let's chat" may represent that the audio data 811 is to be processed by the language model orchestrator component 430).

In some embodiments, if the arbitrator component 882 is uncertain e.g., a confidence score corresponding to whether the orchestrator component 830 and/or the language model orchestrator component 430 is to process is below a threshold), then the arbitrator component 882 may send the audio data 811 to both of the orchestrator component 830 and the language model orchestrator component 430. In such embodiments, the orchestrator component 830 and/or the language model orchestrator component 430 may include further logic for determining further confidence scores during processing representing whether the orchestrator component 830 and/or the language model orchestrator component 430 should continue processing, as is discussed further herein below.

The arbitrator component 882 may send the audio data 811 to an ASR component 850. In some embodiments, the component selected to process the audio data 811 (e.g., the orchestrator component 830 and/or the language model orchestrator component 430) may send the audio data 811 to the ASR component 850. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to the arbitrator component 882, the orchestrator component 830, and/or the language model orchestrator component 430. In instances where the text data is sent to the arbitrator component 882, the arbitrator component 882 may send the text data to the component selected to process the audio data 811 (e.g., the orchestrator component 830 and/or the language model orchestrator component 430). The text data sent from the ASR component 850 to the arbitrator component 882, the orchestrator component 830, and/or the language model orchestrator component 430 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 830 may cause a NLU component (not shown) to perform processing with respect to the ASR data generated by the ASR component 850. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 810, the system component(s) 820, a skill/app component 854, a skill system component(s) 825, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 810. In another example, if the ASR data corresponds to "turn off the lights," the NLU component may determine an intent that the system turn off lights associated with the device 810 or the user 405. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 830. The orchestrator component 830 may forward the NLU results data to a skill component(s) 854. If the NLU results data includes a single NLU hypothesis, the NLU component and the orchestrator component 830 may direct the NLU results data to the skill component(s) 854 associated with the NLU hypothesis. If the NLU results data includes an N-best list of NLU hypotheses, the NLU component and the orchestrator component 830 may direct the top scoring NLU hypothesis to a skill component(s) 854 associated with the top scoring NLU hypothesis. The system may also include a post-NLU ranker which may incorporate other information to rank potential interpretations determined by the NLU component.

In some embodiments, after determining that the orchestrator component 830 and/or the language model orchestrator component 430 should process with respect to the user input data 427, the arbitrator 882 may be configured to periodically determine whether the orchestrator component 830 and/or the language model orchestrator component 430 should continue processing with respect to the user input data 427. For example, after a particular point in the processing of the orchestrator component 830 (e.g., after performing NLU, prior to determining a skill component 854 to process with respect to the user input data 427, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 830 and/or the language model orchestrator component 430 may query the arbitrator component 882 has determined that the orchestrator component 830 and/or the language model orchestrator component 430 should halt processing with respect to the user input data 427. As discussed above, the system 100 may be configured to stream portions of data associated with processing with respect to a user input to the one or more components such that the one or more components may begin performing their configured processing with respect to that data as soon as it is available to the one or more components. As such, the arbitrator component 882 may cause the orchestrator component 830 and/or the language model orchestrator component 430 to begin processing with respect to a user input as soon as a portion of data associated with the user input data 427 is available (e.g., the ASR data, context data, output of the user recognition component 895. Thereafter, once the arbitrator component 882 has enough data to perform the processing described herein above to determine whether the orchestrator component 830 and/or the language model orchestrator component 430 is to process with respect to the user input, the arbitrator component 882 may inform the corresponding component (e.g., the orchestrator component 830 and/or the language model orchestrator component 430) to continue/halt processing with respect to the user input at one of the logical checkpoints in the processing of the orchestrator component 830 and/or the language model orchestrator component 430.

As discussed herein above, in some embodiments, the language model shortlister component 440 (e.g., via the API retrieval component 620 and/or the shortlister language model 640) may be configured to select the orchestrator component 830 to process with respect to the user input and/or a current task to return action response data (e.g., the action response data 455a) representing a response to the user input/current task or a description of an action the orchestrator component 830 may cause to be performed in response to the user input/current task. As such, in some embodiments, although the language model orchestrator component 430 is determined to process with respect to a user input, the language model orchestrator component 430 may determine, during such processing, that the orchestrator component 830 should process with respect to the user input.

A skill system component(s) 825 may communicate with a skill/app component(s) 854 within the system component(s) 820 directly with the orchestrator component 830 and/or the action plan execution component 445, or with other components. A skill system component(s) 825 may be configured to perform one or more actions. An ability to perform such action(s) may sometimes be referred to as a "skill." That is, a skill may enable a skill system component(s) 825 to execute specific functionality in order to provide data or perform some other action requested by a user. For example, a weather service skill may enable a skill system component(s) 825 to provide weather information to the system component(s) 820, a car service skill may enable a skill system component(s) 825 to book a trip with respect to a taxi or ride sharing service, an order pizza skill may enable a skill system component(s) 825 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 820 may be configured with a skill component 854 dedicated to interacting with the skill system component(s) 825. Unless expressly stated otherwise, reference to a skill, skill device, or skill component may include a skill component 854 operated by the system component(s) 820 and/or skill operated by the skill system component(s) 825. Moreover, the functionality described herein as a skill or skill may be referred to using many different terms, such as an action, bot, app, or the like. The skill component 854 and or skill system component(s) 825 may return output data to the orchestrator component 830.

The system component(s) includes a TTS component 856. The TTS component 856 may generate audio data (e.g., synthesized speech) from text data using one or more different methods. Text data input to the TTS component 856 may come from a skill component 854, the orchestrator component 830, or another component of the system. In one method of synthesis called unit selection, the TTS component 856 matches text data against a database of recorded speech. The TTS component 856 selects matching units of recorded speech and concatenates the units together to form audio data. In another method of synthesis called parametric synthesis, the TTS component 856 varies parameters such as frequency, volume, and noise to create audio data including an artificial speech waveform. Parametric synthesis uses a computerized voice generator, sometimes called a vocoder.

The user device 810 may include still image and/or video capture components such as a camera or cameras to capture one or more images. The user device 810 may include circuitry for digitizing the images and/or video for transmission to the system component(s) 820 as image data. The user device 810 may further include circuitry for voice command-based control of the camera, allowing a user 405 to request capture of image or video data. The user device 810 may process the commands locally or send audio data 811 representing the commands to the system component(s) 820 for processing, after which the system component(s) 820 may return output data that can cause the user device 810 to engage its camera.

The system component(s) 820/the user device 810 may include a user recognition component 895 that recognizes one or more users using a variety of data. However, the disclosure is not limited thereto, and the user device 810 may include the user recognition component 895 instead of and/or in addition to the system component(s) 820 without departing from the disclosure.

The user recognition component 895 may take as input the audio data 811 and/or text data output by the ASR component 850. The user recognition component 895 may perform user recognition by comparing audio characteristics in the audio data 811 to stored audio characteristics of users. The user recognition component 895 may also perform user recognition by comparing biometric data (e.g., fingerprint data, iris data, etc.), received by the system in correlation with the present user input, to stored biometric data of users assuming user permission and previous authorization. The user recognition component 895 may further perform user recognition by comparing image data (e.g., including a representation of at least a feature of a user), received by the system in correlation with the present user input, with stored image data including representations of features of different users. The user recognition component 895 may perform additional user recognition processes, including those known in the art.

The user recognition component 895 determines scores indicating whether user input originated from a particular user. For example, a first score may indicate a likelihood that the user input originated from a first user, a second score may indicate a likelihood that the user input originated from a second user, etc. The user recognition component 895 also determines an overall confidence regarding the accuracy of user recognition operations.

Output of the user recognition component 895 may include a single user identifier corresponding to the most likely user that originated the user input. Alternatively, output of the user recognition component 895 may include an N-best list of user identifiers with respective scores indicating likelihoods of respective users originating the user input. The output of the user recognition component 895 may be used to inform processing of the arbitrator component 882, the orchestrator component 830, and/or the language model orchestrator component 430 as well as processing performed by other components of the system.

The system component(s) 820/user device 810 may include a presence detection component that determines the presence and/or location of one or more users using a variety of data.

The system 100 (either on user device 810, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 810, the user profile (associated with the presented login information) may be updated to include information about the user device 810, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 8 may be illustrated as part of system component(s) 820, user device 810, or otherwise, the components may be arranged in other device(s) (such as in user device 810 if illustrated in system component(s) 820 or vice-versa, or in other device(s) altogether) without departing from the disclosure.

In at least some embodiments, the system component(s) may receive the audio data 811 from the user device 810, to recognize speech corresponding to a spoken input in the received audio data 811, and to perform functions in response to the recognized speech. In at least some embodiments, these functions involve sending directives (e.g., commands), from the system component(s) to the user device 810 (and/or other user devices 810) to cause the user device 810 to perform an action, such as output an audible response to the spoken input via a loudspeaker(s), and/or control secondary devices in the environment by sending a control command to the secondary devices.

Thus, when the user device 810 is able to communicate with the system component(s) over the network(s) 199, some or all of the functions capable of being performed by the system component(s) may be performed by sending one or more directives over the network(s) 199 to the user device 810, which, in turn, may process the directive(s) and perform one or more corresponding actions. For example, the system component(s), using a remote directive that is included in response data (e.g., a remote response), may direct the user device 810 to output an audible response (e.g., using TTS processing performed by an on-device TTS component) to a user's question via a loudspeaker(s) of (or otherwise associated with) the user device 810, to output content (e.g., music) via the loudspeaker(s) of (or otherwise associated with) the user device 810, to display content on a display of (or otherwise associated with) the user device 810, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, a hybrid selector, of the user device 810, may send the audio data 811 to the wakeword detection component 820. If the wakeword detection component 820 detects a wakeword in the audio data 811, the wakeword detection component 820 may send an indication of such detection to the hybrid selector. In response to receiving the indication, the hybrid selector may send the audio data 811 to the system component(s) and/or the ASR component of the user device 810. The wakeword detection component 820 may also send an indication, to the hybrid selector, representing a wakeword was not detected. In response to receiving such an indication, the hybrid selector may refrain from sending the audio data 811 to the system component(s), and may prevent the ASR component of the user device 810 from further processing the audio data 811. In this situation, the audio data 811 can be discarded.

In some embodiments, the user device 810 may include some or all of the components illustrated in FIG. 8 and/or discussed herein above with respect to the system component(s) 820. In other embodiments, the components illustrated in FIG. 8 and/or discussed herein with respect to the system component(s) 820 may be distributed across the user device 810 and the system component(s) 820.

In at least some embodiments, the components of the user device 810 (e.g., on-device components) may not have the same capabilities as the components of the system component(s). For example, on-device components may be configured to handle only a subset of the natural language user inputs that may be handled by the system component(s) 820. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 810 attempts to process a natural language user input for which the on-device components are not necessarily best suited, the language processing results determined by the user device 810 may indicate a low confidence or other metric indicating that the processing by the user device 810 may not be as accurate as the processing done by the system component(s).

The hybrid selector, of the user device 810, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 811 to pass to the system component(s) while also receiving (e.g., intercepting) this audio data 811 and sending the audio data 811 to the HEC.

In at least some embodiments, the hybrid selector may further include a local request orchestrator (LRO) configured to notify the ASR component of the user device 810 about the availability of new audio data 811 that represents user speech, and to otherwise initiate the operations of local language processing when new audio data 811 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 810 receives directive data from the system component(s) and chooses to use that remotely-determined directive data.

Thus, when the audio data 811 is received, the HP may allow the audio data 811 to pass through to the system component(s) and the HP may also input the audio data 811 to the on-device ASR component by routing the audio data 811 through the HEC of the hybrid selector, whereby the LRO notifies the on-device ASR component of the audio data 811. At this point, the hybrid selector may wait for response data from either or both of the system component(s) or the local language processing components. However, the disclosure is not limited thereto, and in some examples the hybrid selector may send the audio data 811 only to the local ASR component without departing from the disclosure. For example, the user device 810 may process the audio data 811 locally without sending the audio data 811 to the system component(s).

The local ASR component is configured to receive the audio data 811 to recognize speech in the audio data 811. The user device 810 and/or the system component(s) may associate a unique identifier with each natural language user input. The user device 810 may include the unique identifier when sending the audio data 811 to the system component(s), and the response data from the system component(s) may include the unique identifier to identify which natural language user input the response data corresponds.

In at least some embodiments, the user device 810 may include, or be configured to use, one or more skill components that may work similarly to the skill component(s) 854 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 810 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 810 may be in communication with one or more skill system component(s) 825. For example, a skill system component(s) 825 may be located in a remote environment (e.g., separate location) such that the user device 810 may only communicate with the skill system component(s) 825 via the network(s) 199. However, the disclosure is not limited thereto. For example, in at least some embodiments, a skill system component(s) 825 may be configured in a local environment (e.g., home server and/or the like) such that the user device 810 may communicate with the skill system component(s) 825 via a private network, such as a local area network (LAN).

A skill system component(s) 825 may communicate with a skill component(s) 854 within the system component(s) 820 directly with the orchestrator component 830 and/or the action plan execution component 445, or with other components. A skill system component(s) 825 may be configured to perform one or more actions. An ability to perform such action(s) may sometimes be referred to as a "skill." That is, a skill may enable a skill system component(s) 825 to execute specific functionality in order to provide data or perform some other action requested by a user. For example, a weather service skill may enable a skill system component(s) 825 to provide weather information to the system component(s) 820, a car service skill may enable a skill system component(s) 825 to book a trip with respect to a taxi or ride sharing service, an order pizza skill may enable a skill system component(s) 825 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 820 may be configured with a skill component 854 dedicated to interacting with the skill system component(s) 825. Unless expressly stated otherwise, reference to a skill, skill device, or skill component may include a skill component 854 operated by the system component(s) 820 and/or skill operated by the skill system component(s) 825. Moreover, the functionality described herein as a skill or skill may be referred to using many different terms, such as an action, bot, app, or the like. The skill component 854 and or skill system component(s) 825 may return output data to the orchestrator component 830.

Various techniques may be used to train and operate models to perform various steps described herein, such as user recognition, sentiment detection, image processing, dialog management, natural language processing, etc. Models may be trained and operated according to various machine learning techniques. Such techniques may be used for trained models such as, neural networks, deep neural networks, recurrent neural networks, language models, LLMs, generative models, inference engines, trained classifiers, discriminative models, probabilistic models, etc. Examples of trained classifiers include Support Vector Machines (SVMs), neural networks, decision trees, Ada-Boost (short for "Adaptive Boosting") combined with decision trees, and random forests.

Example supervised learning techniques may involve learning algorithms that analyze data and recognize patterns in the data, and which are commonly used for classification and regression analysis. Given a set of training examples, each marked as belonging to one of two categories, a training algorithm builds a trained model that assigns new examples into one category or the other, making it a non-probabilistic binary linear classifier. Other trained models may be built with the training set identifying more than two categories, with the trained model determining which category is most similar to input data. A trained model may be mapped so that the examples of the separate categories are divided/separated by distinctive gaps. New examples/inputs are then mapped into that same space and predicted to belong to a category based on which side of the gaps they fall on. Some trained models may issue a "score" indicating which category the input data most closely matches. The score may provide an indication of how closely the data matches the category.

Training a machine-based model component such as, generative models, discriminative models, etc., may require establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, unsupervised learning, finetuning learning, reinforcement learning, stochastic learning, or other known techniques.

Figure 9:
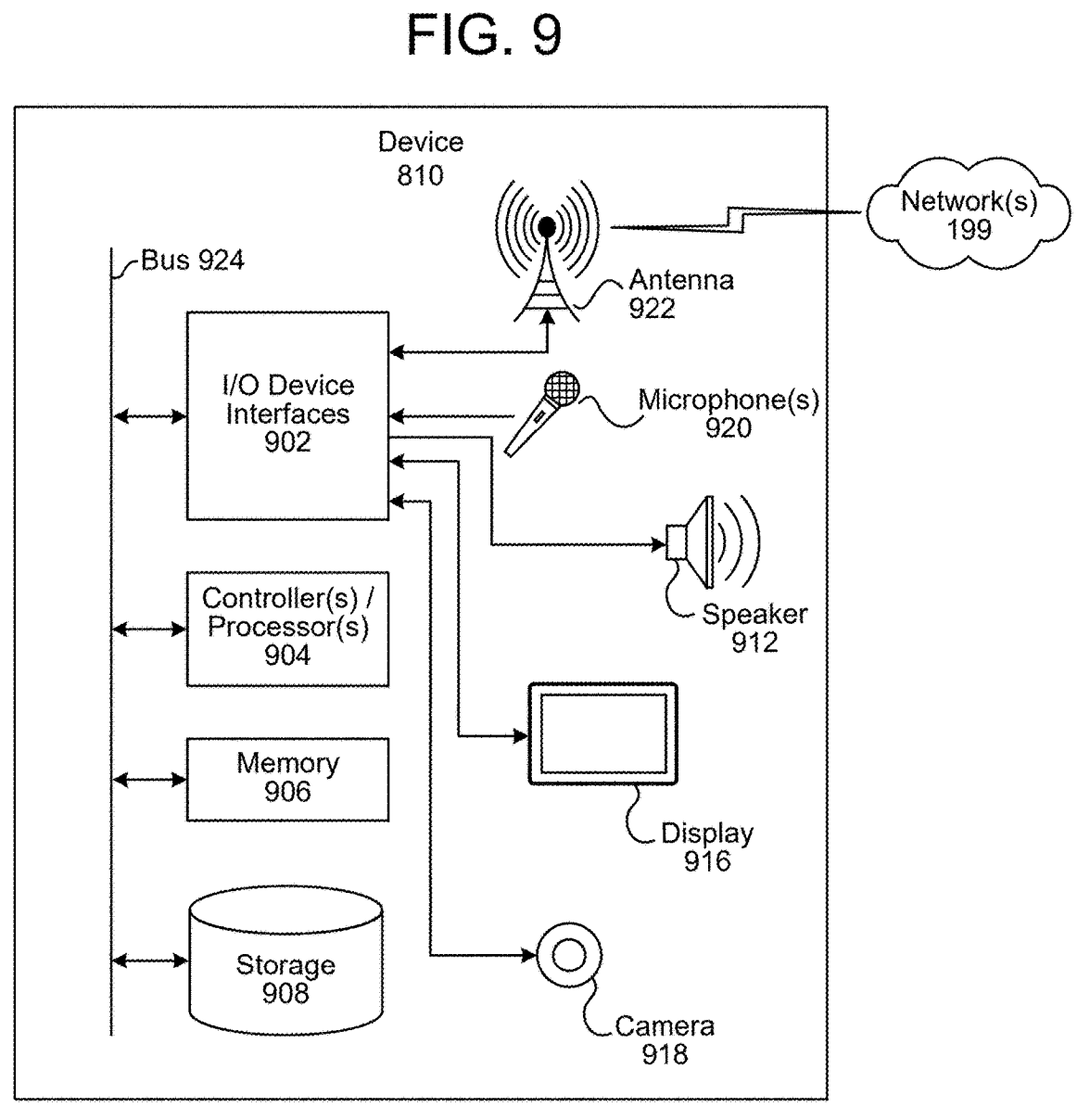

FIG. 9 is a block diagram conceptually illustrating a user device 810 that may be used with the system. FIG. 10 is a block diagram conceptually illustrating example components of a remote device, such as the natural language command processing system component(s), which may assist with ASR processing, NLU processing, etc., and a skill system component(s) 825. System component(s) (820/825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/ components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 810 may operate locally to a user (e.g., within a same environment so the device may receive inputs and playback outputs for the user) the server/system component(s) may be located remotely from the user device 810 as its operations may not require proximity to the user. The server/system component(s) may be located in an entirely different location from the user device 810 (for example, as part of a cloud computing system or the like) or may be located in a same environment as the user device 810 but physically separated therefrom (for example a home server or similar device that resides in a user's home or business but perhaps in a closet, basement, attic, or the like). The system component(s) 820 may also be a version of a user device 810 that includes different (e.g., more) processing capabilities than other user device(s) 810 in a home/ office. One benefit to the server/system component(s) being in a user's home/business is that data used to process a command/return a response may be kept within the user's home, thus reducing potential privacy concerns.

Multiple system components (820/825) may be included in the overall system 100 of the present disclosure, such as one or more natural language processing system component(s) 820 for performing ASR processing, one or more natural language processing system component(s) 820 for performing NLU processing, one or more skill system component(s) 825, etc. In operation, each of these systems may include computer-readable and computer-executable instructions that reside on the respective device (820/825), as will be discussed further below.

Each of these devices (810/820/825) may include one or more controllers/processors (904/1004), which may each include a central processing unit (CPU) for processing data and computer-readable instructions, and a memory (906/ 1006) for storing data and instructions of the respective device. The memories (906/1006) may individually include volatile random-access memory (RAM), non-volatile read only memory (ROM), non-volatile magnetoresistive memory (MRAM), and/or other types of memory. Each device (810/820/825) may also include a data storage component (908/1008) for storing data and controller/processor-executable instructions. Each data storage component (908/ 1008) may individually include one or more non-volatile storage types such as magnetic storage, optical storage, solid-state storage, etc. Each device (810/820/825) may also be connected to removable or external non-volatile memory and/or storage (such as a removable memory card, memory key drive, networked storage, etc.) through respective input/ output device interfaces (902/1002).

Computer instructions for operating each device (810/ 820/825) and its various components may be executed by the respective device's controller(s)/processor(s) (904/ 1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (810/820/825) includes input/output device interfaces (902/1002). A variety of components may be connected through the input/output device interfaces (902/ 1002), as will be discussed further below. Additionally, each device (810/820/825) may include an address/data bus (924/ 1024) for conveying data among components of the respective device. Each component within a device (810/820/825) may also be directly connected to other components in addition to (or instead of) being connected to other components across the bus (924/1024).

Referring to FIG. 9, the user device 810 may include input/output device interfaces 902 that connect to a variety of components such as an audio output component such as a speaker 912, a wired headset or a wireless headset (not illustrated), or other component capable of outputting audio. The user device 810 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 810 may additionally include a display 916 for displaying content. The user device 810 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the user device(s) 810, the natural language command processing system component(s), or a skill system component(s) 825 may include their own dedicated processors, memory, and/or storage. Alternatively, one or more of the components of the user device(s) 810, the natural language command processing system component(s), or a skill system component(s) 825 may utilize the I/O interfaces (902/1002), processor(s) (904/ 1004), memory (906/1006), and/or storage (908/1008) of the user device(s) 810, natural language command processing system component(s), or the skill system component(s) 825, respectively. Thus, the ASR component 850 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 810, the natural language command processing system component(s), and a skill system component(s) 825, as described herein, are illustrative, and may be located as a stand-alone device or may be included, in whole or in part, as a component of a larger device or system. As can be appreciated, a number of components may exist either on a system component(s) and/or on user device 810. For example, ASR component 850 and TTS component 856), etc., for example as illustrated in FIG. 8. Unless expressly noted otherwise, the system version of such components may operate similarly to the device version of such components and thus the description of one version (e.g., the system version or the local version) applies to the description of the other version (e.g., the local version or system version) and vice-versa.

Figure 11:
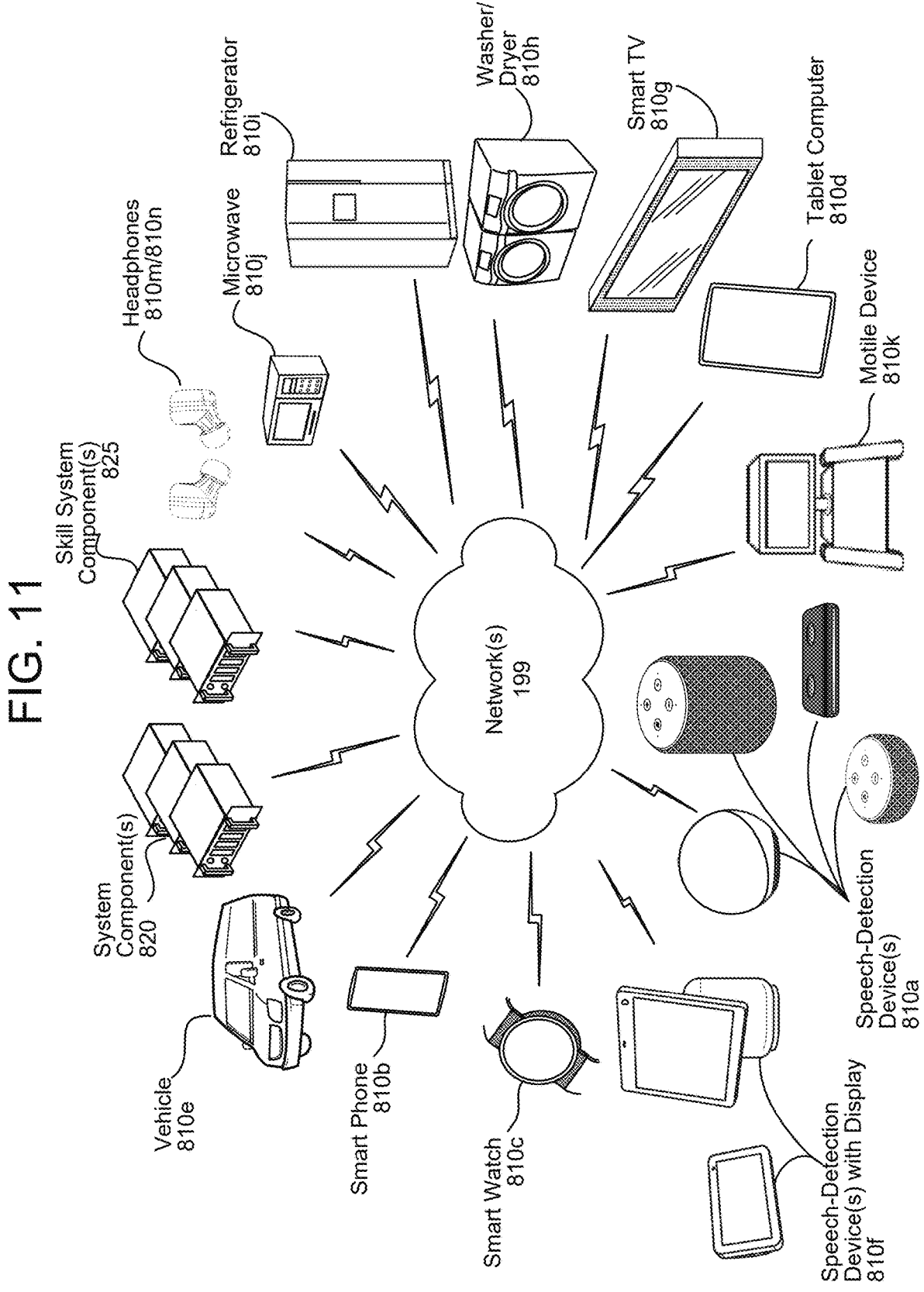
FIG. 11 illustrates an example of a network for use with the overall system, according to embodiments of the present disclosure.

As illustrated in FIG. 11, multiple devices (810a-810n, 820, 825) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 810a, a smart phone 810b, a smart watch 810c, a tablet computer 810d, a vehicle 810e, a speech-detection device with display 810f, a display/smart television 810g, a washer/dryer 810h, a refrigerator 810i, a microwave 810j, autonomously motile user device 810k (e.g., a robot), etc., may be connected to the network(s) 199 through a wireless service provider, over a Wi-Fi or cellular network connection, or the like. Other devices are included as network-connected support devices, such as the natural language command processing system component(s) 820, the skill system component(s) 825, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, etc. of the natural language command processing system component(s) 820.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first data representing a first question;

receiving second data representing a reference answer to the first question;

sending a first request including the first question to a first component configured to provide data usable by a language model to generate a response;

receiving, in response to the first request and from the first component, a first plurality of document results;

processing the first data, the second data, and the first plurality of document results using a first trained model to determine a first value representing whether at least one document result of the first plurality of document results can be used to determine an answer that corresponds to the reference answer;

determining that the first value fails to satisfy a condition;

receiving third data representing a user query;

determining, using the third data, that the user query corresponds to the first question;

based on the first value failing to satisfy the condition, sending, to a second component, a second request including the first question, the second component configured to provide data usable by the language model to generate a response;

receiving, from the second component, a second plurality of document results;

processing, using the language model, the third data and the second plurality of document results to generate a response to the user query; and causing presentation of the response.

2. The computer-implemented method of claim 1, wherein the second data includes a first set of sentences and the method further comprises:

processing, using the first trained model, a first document result of the first plurality of document results and the second data to determine a second value representing that the first document result can be used to determine the reference answer, the second value being based on a first portion of the first set of sentences being semantically similar to a second set of sentences in the first document result;

processing, using the first trained model, a second document result of the first plurality of document results and the reference answer to determine a third value representing that the second document result can be used to determine the reference answer, the third value being based on a second portion of the first set of sentences being semantically similar to a third set of sentences in the second document result; and determining the first value based on the second value and the third value.

3. The computer-implemented method of claim 1, further comprising:

processing, using the first trained model, the first plurality of document results and the reference answer to determine:

a second value representing that a first document result of the first plurality of document results includes a first set of tokens semantically similar to a first portion of the reference answer, and a third value representing that a second document result of the first plurality of document results includes a second set of tokens semantically similar to a second portion of the reference answer; and determining the first value based on the second value and third value.

4. The computer-implemented method of claim 1, further comprising:

receiving fourth data including a second question and a corresponding second answer;

receiving, from the first component, a third plurality of document results based on a third request including the second question;

processing, using the first trained model, the fourth data and the third plurality of document results to determine a second value representing the third plurality of document results can be used to determine the second answer;

determining that the second value satisfies the condition;

based on the second value satisfying the condition, storing, in a data storage, fifth data including the third plurality of document results, the fifth data associated with the second question;

receiving a second user query corresponding to the second question;

determining, from the data storage, the fifth data;

determining a prompt including the second user query and the fifth data;

processing, using the language model, the prompt to generate a second response to the second user query; and causing presentation of the second response.

5. A computer-implemented method comprising:

receiving first question data representing a first question;

receiving first answer data representing a first answer corresponding to the first question;

receiving a first plurality of document results based on a first request to a first component, the first request including the first question data;

processing, using a trained model, the first plurality of document results, the first question data and the first answer data to determine a first value representing whether at least one of the first plurality of document results can be used to determine a first response that corresponds to the first answer;

determining that the first value fails to satisfy a first condition; and based on the first value failing to satisfy the first condition, causing a language model to use a second plurality of document results to generate the first response, wherein the second plurality of document results are determined using a second component.

6. The computer-implemented method of claim 5, further comprising:

determining, using the trained model, a second value representing that a first document result of the first plurality of document results corresponds to the first answer;

and determining the first value based on the second value.

7. The computer-implemented method of claim 5, further comprising:

determining, using the trained model, a second value representing that a first document result of the first plurality of document results corresponds to a first portion of the first answer;

determining, using the trained model, a third value representing that a second document result of the first plurality of document results corresponds to a second portion of the first answer, the second portion being different than the first portion; and determining the first value based on the second value and the third value.

8. The computer-implemented method of claim 5, further comprising:

processing, using the trained model, the second plurality of document results, the first question data and the first answer data to determine a second value representing that at least one of the second plurality of document results can be used to determine the first response corresponding to the first answer;

after determining that the second value satisfies the first condition, storing data representing an association between the second plurality of document results and the first question data;

receiving a user query corresponding to the first question;

based on the user query corresponding to the first question, retrieving the second plurality of document results;

determining a prompt based on the user query and including the second plurality of document results; and processing, using the language model, the prompt to determine the first response to the user query.

9. The computer-implemented method of claim 5, further comprising:

receiving second question data representing a second question;

receiving second answer data representing a second answer corresponding to the second question;

receiving a third plurality of document results based on a second request to the first component, the second request including the second question data;

processing, using the trained model, the third plurality of document results, the second question data and the second answer data to determine a second value representing whether at least one of the second plurality of document results can be used to determine a second response that corresponds to the second answer;

determining that the second value fails to satisfy the first condition; and based on the second value failing to satisfy the first condition, causing the language model to generate a third response to an input corresponding to the second question, the third response indicating that the language model is unable to respond to the input.

10. The computer-implemented method of claim 5, further comprising:

receiving second answer data representing a second answer generated by the language model to the first question;

processing, using the trained model, the first plurality of document results, the first question data and the second answer data to determine a second value representing that at least one of the first plurality of document results can be used to determine the second answer;

determining the second value fails to satisfy the first condition; and based on the second value failing to satisfy the first condition, determining that the language model is to be further trained with respect to the first question.

11. The computer-implemented method of claim 5, further comprising:

storing data representing an association between the first question data and the second component, the association indicating that the second component to be used to retrieve content for an input similar to the first question data;

receiving user input data that is semantically similar to the first question data;

determining, based on the stored data, that the second component is to be used;

determining a prompt based on the user input data and including an identifier for the second component; and processing, using the language model, the prompt to generate a request to the second component.

12. A system comprising:

at least one processor; and at least one memory including instructions that, when executed by the at least one processor, cause the system to:

receive first question data representing a first question;

receive first answer data representing a first answer corresponding to the first question;

receive a first plurality of document results based on a first request to a first component, the first request including the first question data;

process, using a trained model, the first plurality of document results, the first question data and the first answer data to determine a first value representing that at least one of the first plurality of document results can be used to determine a first response that corresponds to the first answer;

determine that the first value fails to satisfy a first condition; and based on the first value failing to satisfy the first condition, cause a language model to use a second plurality of document results to generate the first response, wherein the second plurality of document results are determined using a second component.

13. The system of claim 12, wherein the at least one memory includes further instructions that, when executed by the at least one processor, further cause the system to:

determine, using the trained model, a second value representing that a first document result of the first plurality of document results corresponds to the first answer;

and determine the first value based on the second value.

14. The system of claim 12, wherein the at least one memory includes further instructions that, when executed by the at least one processor, further cause the system to:

determine, using the trained model, a second value representing that a first document result of the first plurality of document results corresponds to a first portion of the first answer;

determine, using the trained model, a third value representing that a second document result of the first plurality of document results corresponds to a second portion of the first answer, the second portion being different than the first portion; and determine the first value based on the second value and the third value.

15. The system of claim 12, wherein the at least one memory includes further instructions that, when executed by the at least one processor, further cause the system to:

process, using the trained model, the second plurality of document results, the first question data and the first answer data to determine a second value representing that at least on of the second plurality of document results can be used to determine the first response corresponding to the first answer;

after determining that the second value satisfies the first condition, store data representing an association between the second plurality of document results and the first question data;

receive a user query corresponding to the first question;

based on the user query corresponding to the first question, retrieve the second plurality of document results;

determine a prompt based on the user query and including the second plurality of document results; and process, using the language model, the prompt to determine the first response to the user query.

16. The system of claim 12, wherein the at least one memory includes further instructions that, when executed by the at least one processor, further cause the system to:

receive second question data representing a second question;

receive second answer data representing a second answer corresponding to the second question;

receive a third plurality of document results based on a second request to the first component, the second request including the second question data;

process, using the trained model, the third plurality of document results, the second question data and the second answer data to determine a second value representing whether at least one of the second plurality of document results can be used to determine a second response that corresponds to the second answer;

determine that the second value fails to satisfy the first condition; and based on the second value failing to satisfy the first condition, cause the language model to generate a third response to an input corresponding to the second question, the third response indicating that the language model is unable to respond to the input.

17. The system of claim 12, wherein the at least one memory includes further instructions that, when executed by the at least one processor, further cause the system to:

receive second answer data representing a second answer generated by the language model to the first question;

process, using the trained model, the first plurality of document results, the first question data and the second answer data to determine a second value representing that at least one of the first plurality of document results can be used to determine the second answer;

determine the second value fails to satisfy the first condition; and based on the second value failing to satisfy the first condition, determine that the language model is to be further trained with respect to the first question.

18. The system of claim 12, wherein the at least one memory includes further instructions that, when executed by the at least one processor, further cause the system to:

store data representing an association between the first question data and the second component, the association indicating that the second component to be used to retrieve content for an input similar to the first question data;

receive user input data that is semantically similar to the first question data;

determine, based on the stored data, that the first component is to be used;

determine a prompt based on the user input data and including an identifier for the second component; and process, using the language model, the prompt to generate a request to the second component.

* * * * *